US009463885B2

(12) United States Patent
Actis

(10) Patent No.: US 9,463,885 B2
(45) Date of Patent: *Oct. 11, 2016

(54) BAGGING ASSEMBLY

(71) Applicant: H.W.J. DESIGNS FOR AGRIBUSINESS, INC., Clovis, CA (US)

(72) Inventor: Bradley P. Actis, Clovis, CA (US)

(73) Assignee: H.W.J. Designs for Agribusiness, Inc., Clovis, CA (US)

( * ) Notice: Subject to any disclaimer, the term of this patent is extended or adjusted under 35 U.S.C. 154(b) by 654 days.

This patent is subject to a terminal disclaimer.

(21) Appl. No.: 13/842,908

(22) Filed: Mar. 15, 2013

(65) Prior Publication Data

US 2013/0283730 A1    Oct. 31, 2013

Related U.S. Application Data

(63) Continuation of application No. 12/397,138, filed on Mar. 3, 2009, now Pat. No. 8,490,367.

(60) Provisional application No. 61/033,376, filed on Mar. 3, 2008, provisional application No. 61/118,330, filed on Nov. 26, 2008, provisional application No. 61/118,175, filed on Nov. 26, 2008.

(51) Int. Cl.
*B65B 63/00* (2006.01)
*B65B 5/04* (2006.01)
*A01F 25/14* (2006.01)
(Continued)

(52) U.S. Cl.
CPC ............ *B65B 5/045* (2013.01); *A01F 25/14* (2013.01); *B65B 43/18* (2013.01); *B65B 43/465* (2013.01); *B65B 63/02* (2013.01)

(58) Field of Classification Search
CPC ....... B65B 5/045; B65B 43/26; B65B 43/46; B65B 43/465; B65B 63/00
See application file for complete search history.

(56) References Cited

U.S. PATENT DOCUMENTS 3,206,913 A * 9/1965 Fleigher .................. B65B 43/36
                                                   53/385.1
3,464,298 A * 9/1969 Roach ....................... G01N 1/04
                                                   83/620

(Continued)

FOREIGN PATENT DOCUMENTS

JP    64-020410 U    2/1989
KR    20-0355927 Y1    7/2004

OTHER PUBLICATIONS

International Search Report completed and mailed Oct. 13, 2009 from related PCT Application No. PCT/US2009/035914, filed Mar. 3, 2009 (5 pages).

(Continued)

*Primary Examiner* — Gloria R Weeks
(74) *Attorney, Agent, or Firm* — Klein, O'Neill & Singh, LLP

(57) ABSTRACT

A bagging assembly for bagging bales of fibrous material is disclosed. The bagging assembly incorporates a chute defining a channel for receiving a bale, which is pushed there between by a stuffing assembly. Aspects of the bagging assembly include raising a bale using a bale elevator to a higher elevation position so that the bale could be stuffed by the stuffing assembly and using a bag retrieving mechanism for retrieving a bag from a bag location for use in bagging the bale.

44 Claims, 39 Drawing Sheets

(51) Int. Cl.
   *B65B 43/18*   (2006.01)
   *B65B 43/46*   (2006.01)
   *B65B 63/02*   (2006.01)

(56) References Cited

U.S. PATENT DOCUMENTS

| | | | | |
|---|---|---|---|---|
| 3,868,807 A * | 3/1975 | Noyes | B65B 5/067 | 53/459 |
| 3,903,677 A * | 9/1975 | Bowman | B65B 43/34 | 53/381.1 |
| 3,948,021 A * | 4/1976 | Buck, Jr. | B65B 63/02 | 100/14 |
| 4,078,358 A * | 3/1978 | Henderson | B65B 39/08 | 53/373.6 |
| 4,300,327 A * | 11/1981 | Bridger | B65B 5/045 | 53/255 |
| 4,320,615 A * | 3/1982 | Gmur | B65B 43/30 | 53/386.1 |
| 4,370,845 A * | 2/1983 | Perolls | B65B 7/06 | 53/374.9 |
| 4,541,227 A * | 9/1985 | Coad | B65B 43/26 | 53/386.1 |
| 4,561,238 A | 12/1985 | Odom | | |
| 4,644,735 A * | 2/1987 | Savigny | B65B 43/30 | 53/384.1 |
| 4,704,845 A * | 11/1987 | Bruno | B65B 7/06 | 53/373.6 |
| 4,939,891 A * | 7/1990 | Podini | B65B 5/106 | 414/791.6 |
| 5,003,754 A | 4/1991 | Stirling | | |
| 5,033,754 A * | 7/1991 | Finch | A63F 3/0625 | 273/299 |
| 5,048,266 A * | 9/1991 | Wieckowicz | B65B 43/26 | 53/385.1 |
| 5,088,271 A * | 2/1992 | Westaway | A01F 25/14 | 53/515 |
| 5,117,614 A * | 6/1992 | Johnsen | B65B 35/50 | 53/171 |
| 5,127,212 A * | 7/1992 | Johnsen | B65B 35/50 | 193/2 C |
| 5,178,020 A * | 1/1993 | Elam | G01N 1/04 | 73/864.42 |
| 5,201,166 A * | 4/1993 | Johnsen | B65B 43/18 | 141/114 |
| 5,369,935 A * | 12/1994 | Lang | B65B 27/125 | 53/176 |
| 5,392,591 A * | 2/1995 | Simpson | A01F 15/005 | 53/435 |
| 5,442,898 A * | 8/1995 | Gabree | B65B 37/04 | 53/385.1 |
| 5,495,707 A * | 3/1996 | Lauzon | B65B 51/00 | 53/370.7 |
| 5,628,168 A * | 5/1997 | Inman | A01F 25/14 | 53/567 |
| 5,829,233 A * | 11/1998 | Stirling | A01D 90/083 | 53/567 |
| 6,421,984 B1 * | 7/2002 | Murgatroyd | B65B 25/16 | 53/284.7 |
| 6,662,532 B1 * | 12/2003 | Droog | B65B 43/36 | 53/373.6 |
| 6,672,038 B2 * | 1/2004 | McGrane | B65B 43/465 | 53/250 |
| 6,895,726 B2 * | 5/2005 | Pinto | B65B 5/045 | 53/384.1 |
| 6,976,350 B2 * | 12/2005 | Greening | B65B 43/465 | 53/384.1 |
| 7,013,625 B2 * | 3/2006 | Curles | B65B 43/30 | 53/261 |
| 8,336,404 B2 * | 12/2012 | Actis | B65B 43/267 | 73/864 |
| 8,490,367 B2 * | 7/2013 | Actis | A01F 25/14 | 53/235 |
| 8,615,974 B2 * | 12/2013 | Suzuki | B65B 5/045 | 53/384.1 |
| 2003/0205033 A1 * | 11/2003 | Schmucker | B65B 61/28 | 53/493 |
| 2004/0055250 A1 * | 3/2004 | Main | B65B 43/18 | 53/386.1 |
| 2004/0190796 A1 * | 9/2004 | Main | B65D 33/14 | 383/9 |
| 2006/0059868 A1 * | 3/2006 | Melville | B65B 5/045 | 53/570 |
| 2006/0096253 A1 * | 5/2006 | Cullen | A01F 25/14 | 53/459 |
| 2007/0017187 A1 * | 1/2007 | Chikatani | B65B 43/36 | 53/459 |
| 2009/0188332 A1 * | 7/2009 | Actis | B65B 43/267 | 73/864.31 |
| 2009/0229226 A1 * | 9/2009 | Beeland | B65B 27/125 | 53/450 |
| 2011/0072767 A1 * | 3/2011 | Suzuki | B65B 5/045 | 53/570 |
| 2014/0360135 A1 * | 12/2014 | Honegger | B65B 27/125 | 53/455 |

OTHER PUBLICATIONS

Written Opinion completed and mailed Oct. 13, 2009 from related PCT Application No. PCT/US2009/035914, filed Mar. 3, 2009 (5 pages).
Office Action mailed Dec. 17, 2010 from corresponding U.S. Appl. No. 12/397,138.
Final Office Action mailed May 24, 2011 from corresponding U.S. Appl. No. 12/397,138.
Office Action mailed Dec. 16, 2011 from corresponding U.S. Appl. No. 12/397,138.
Final Office Action mailed May 16, 2012 from corresponding U.S. Appl. No. 12/397,138.
Office Action mailed Dec. 18, 2012 from corresponding U.S. Appl. No. 12/397,138.

* cited by examiner

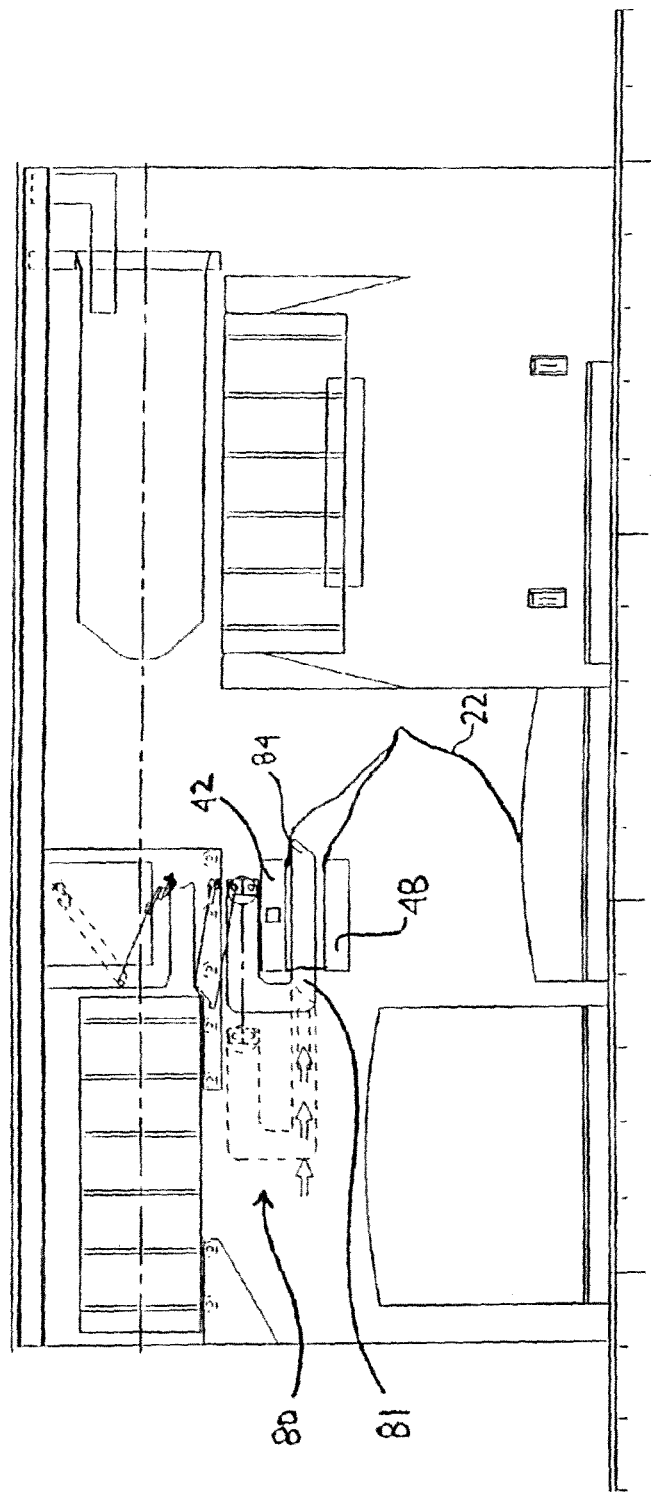

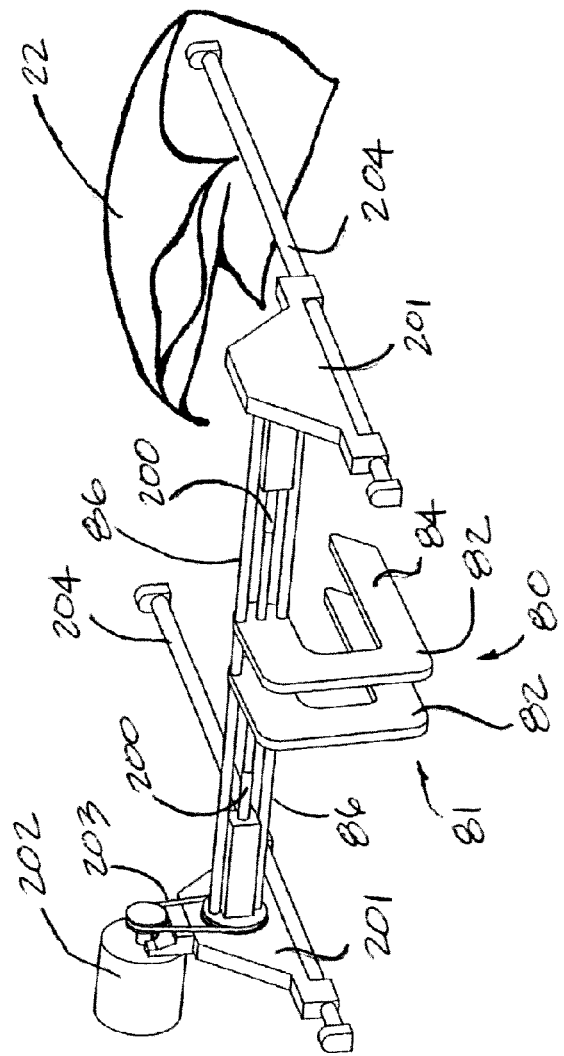

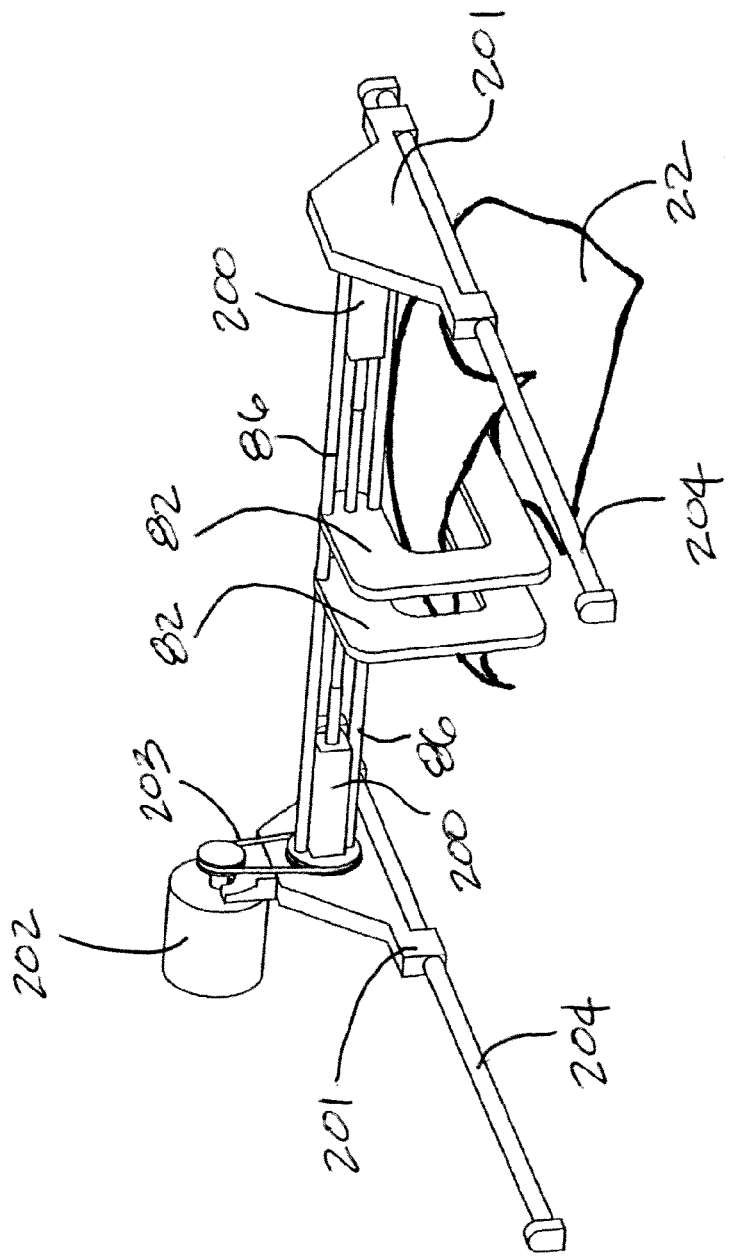

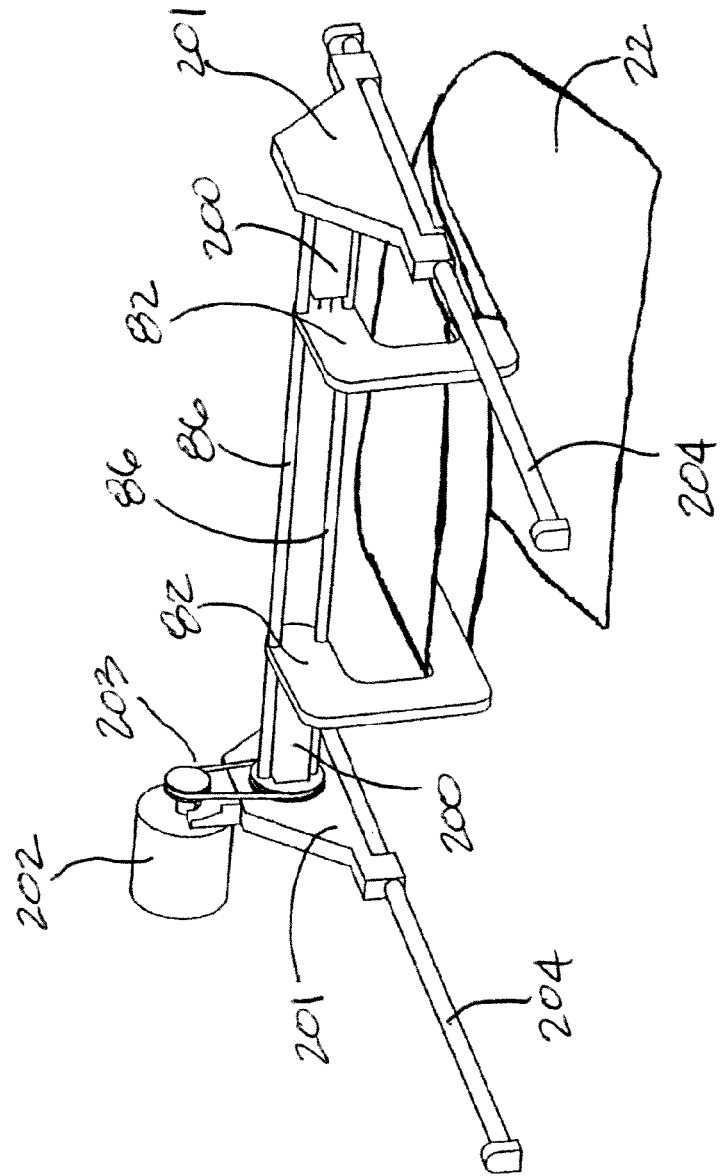

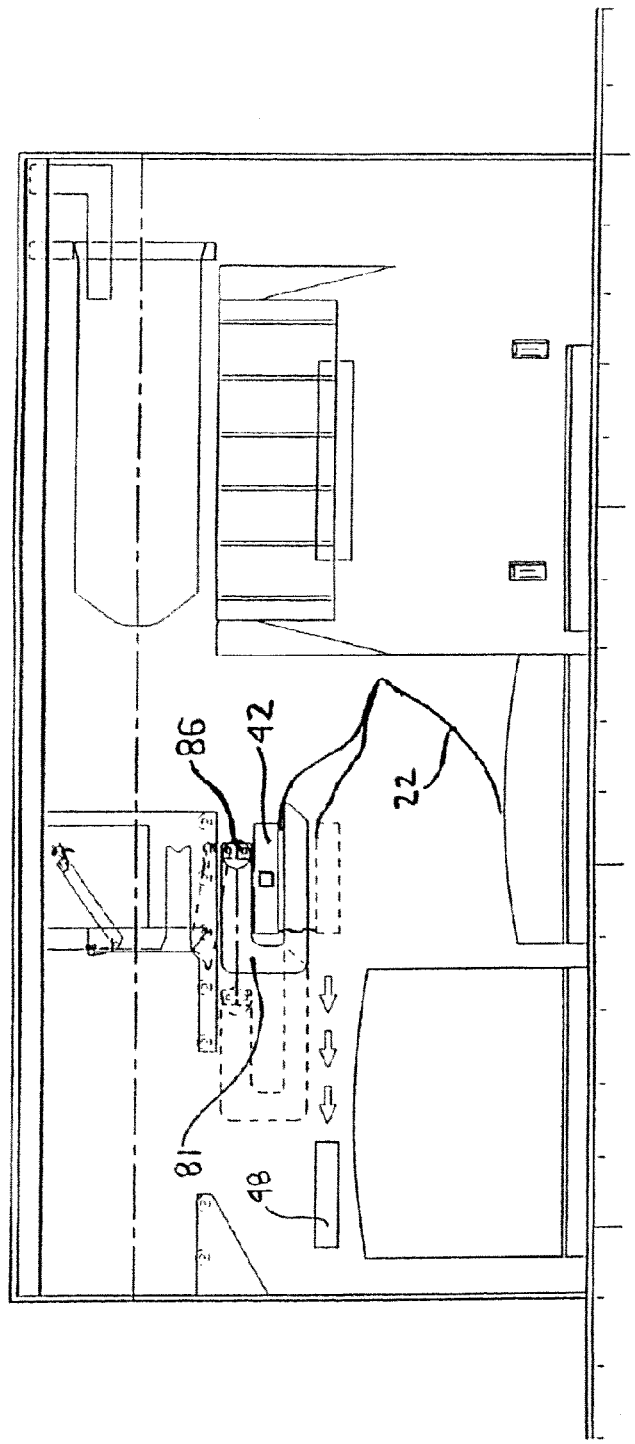

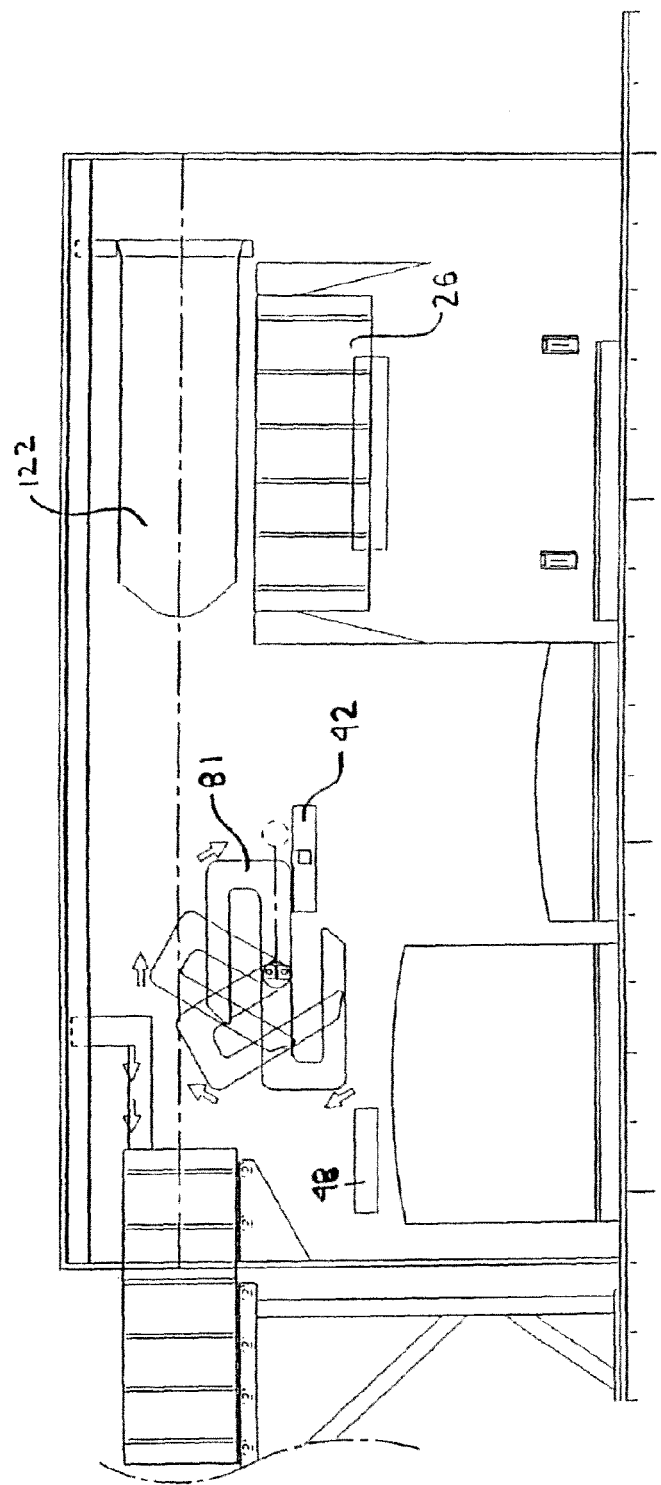

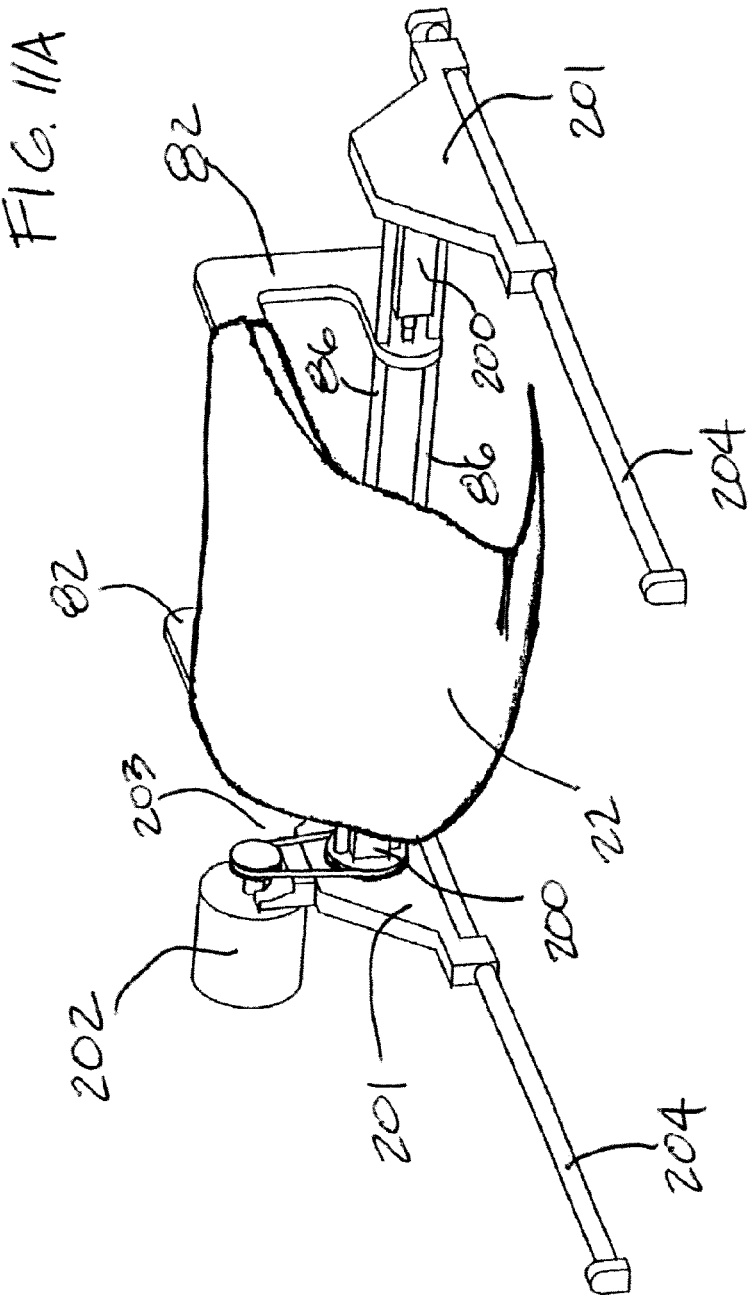

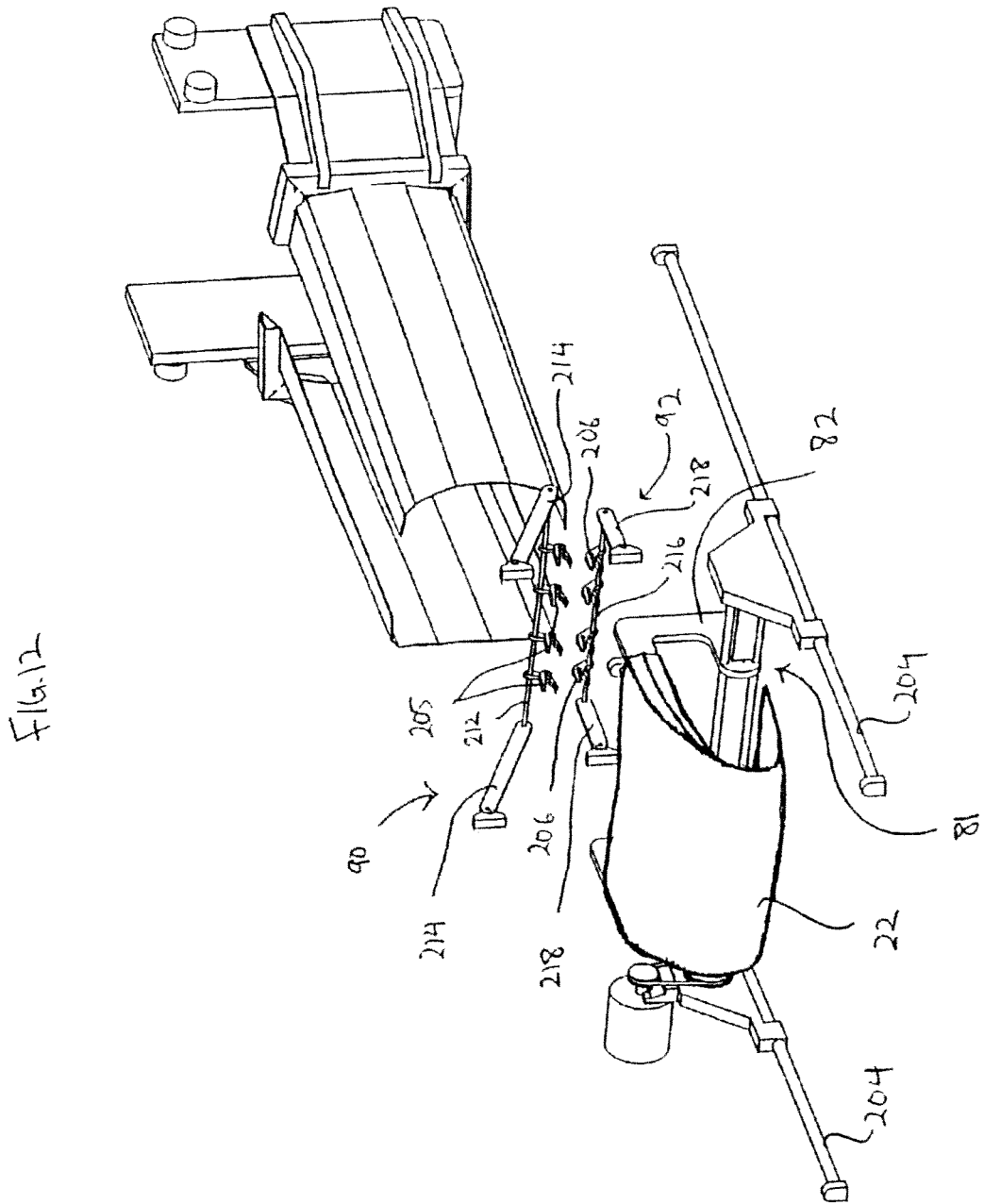

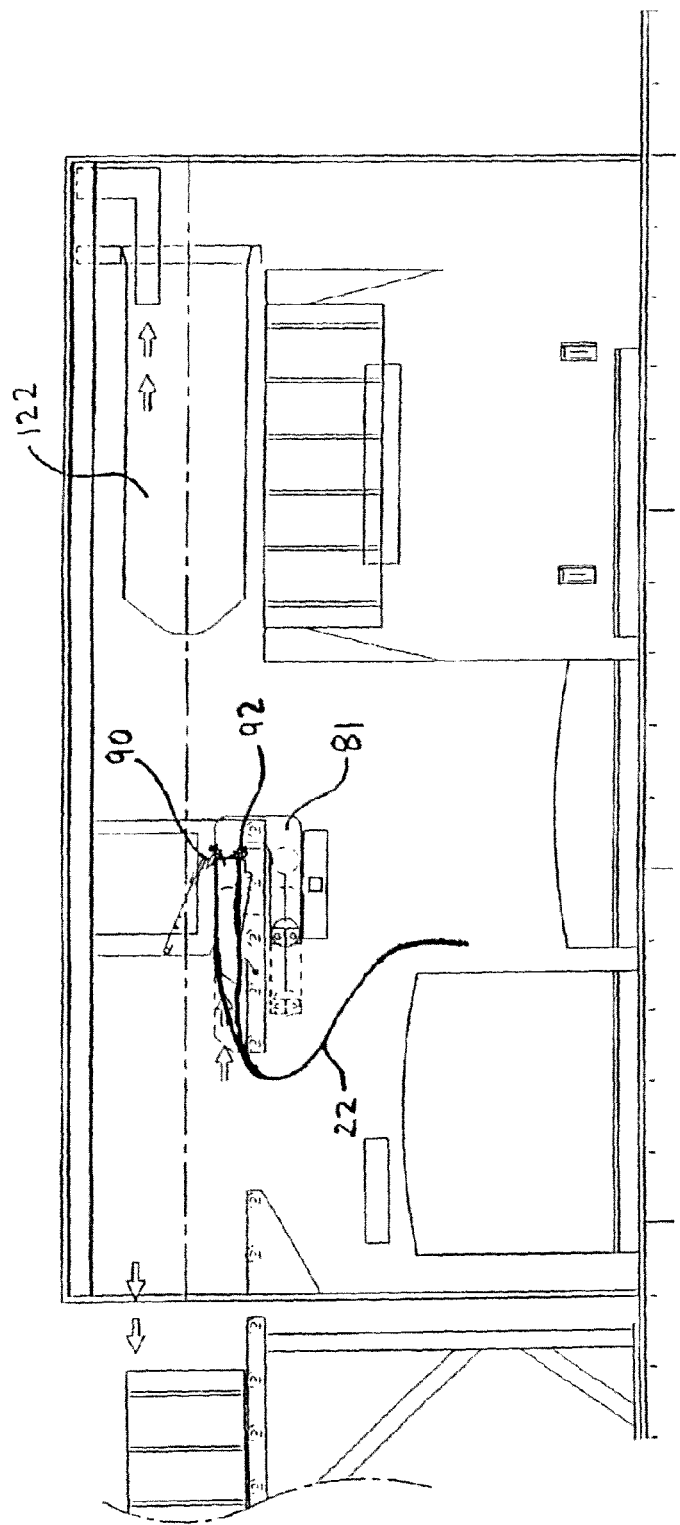

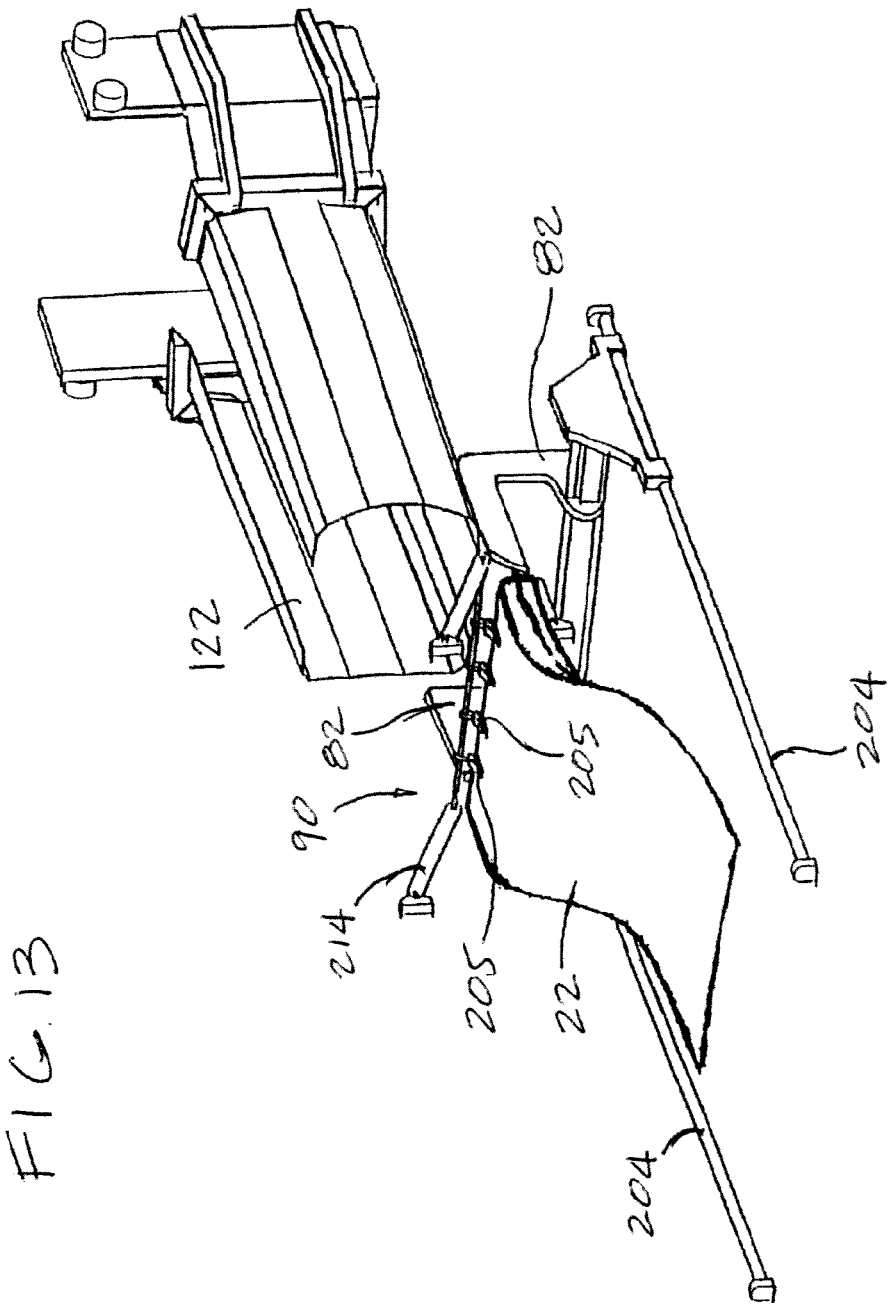

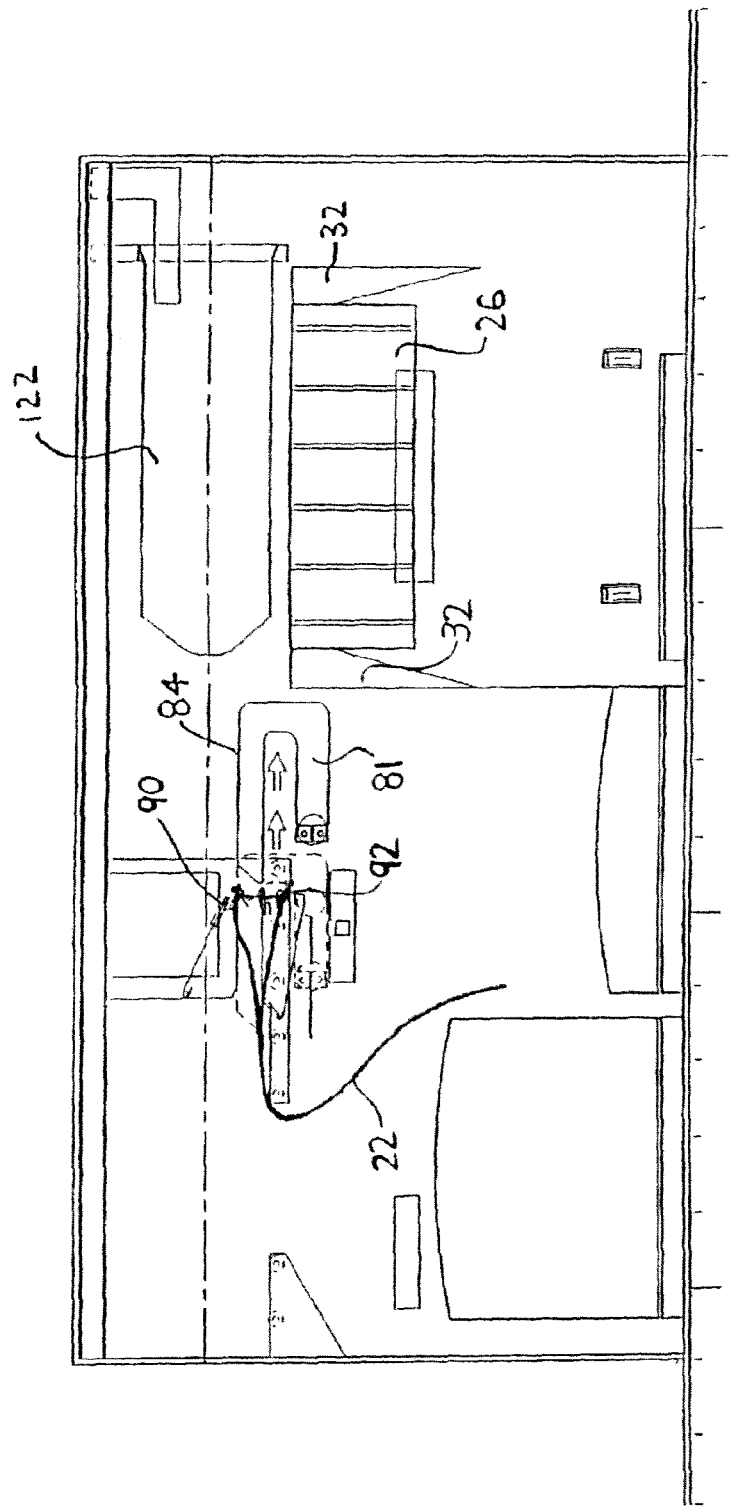

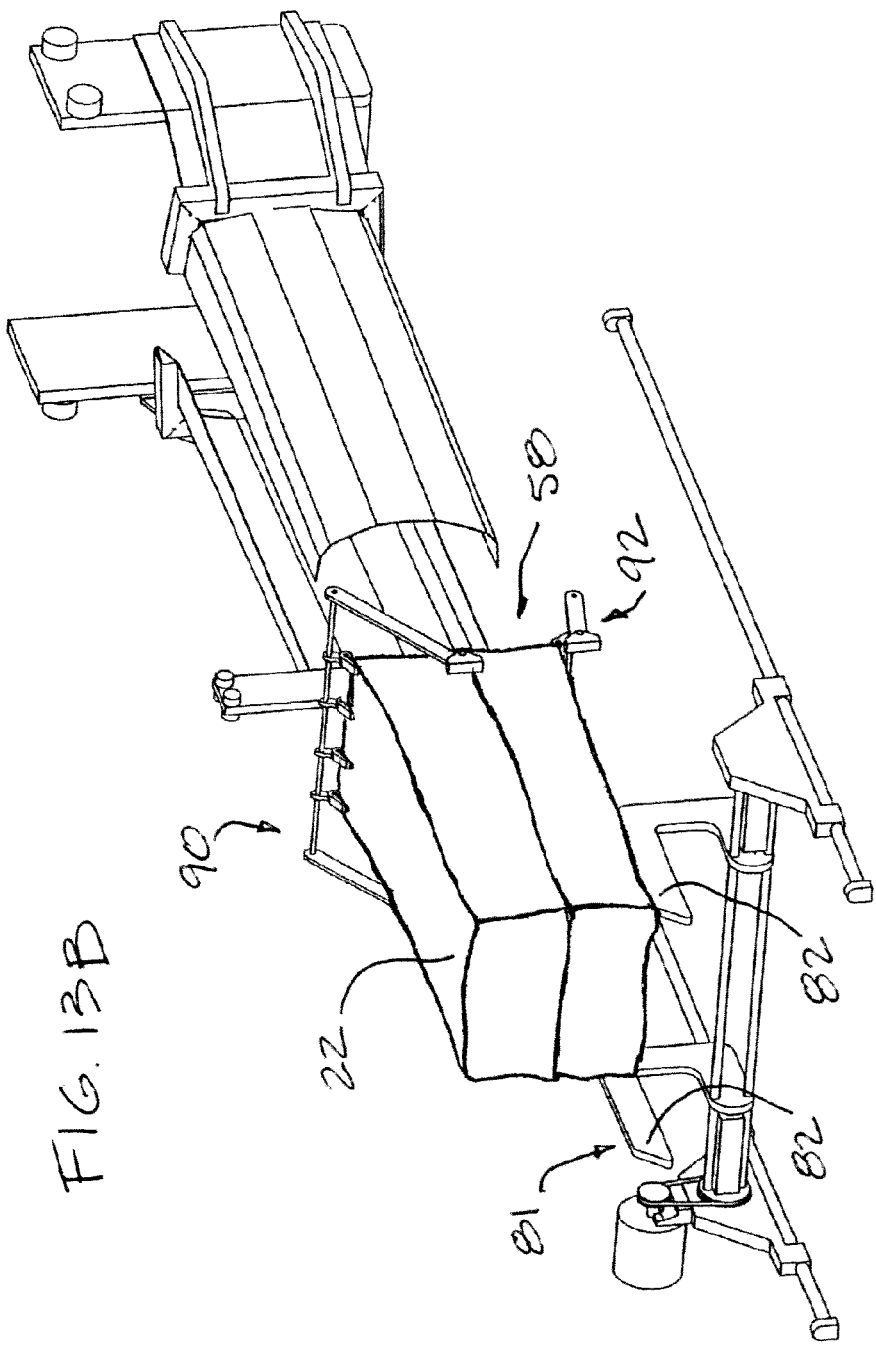

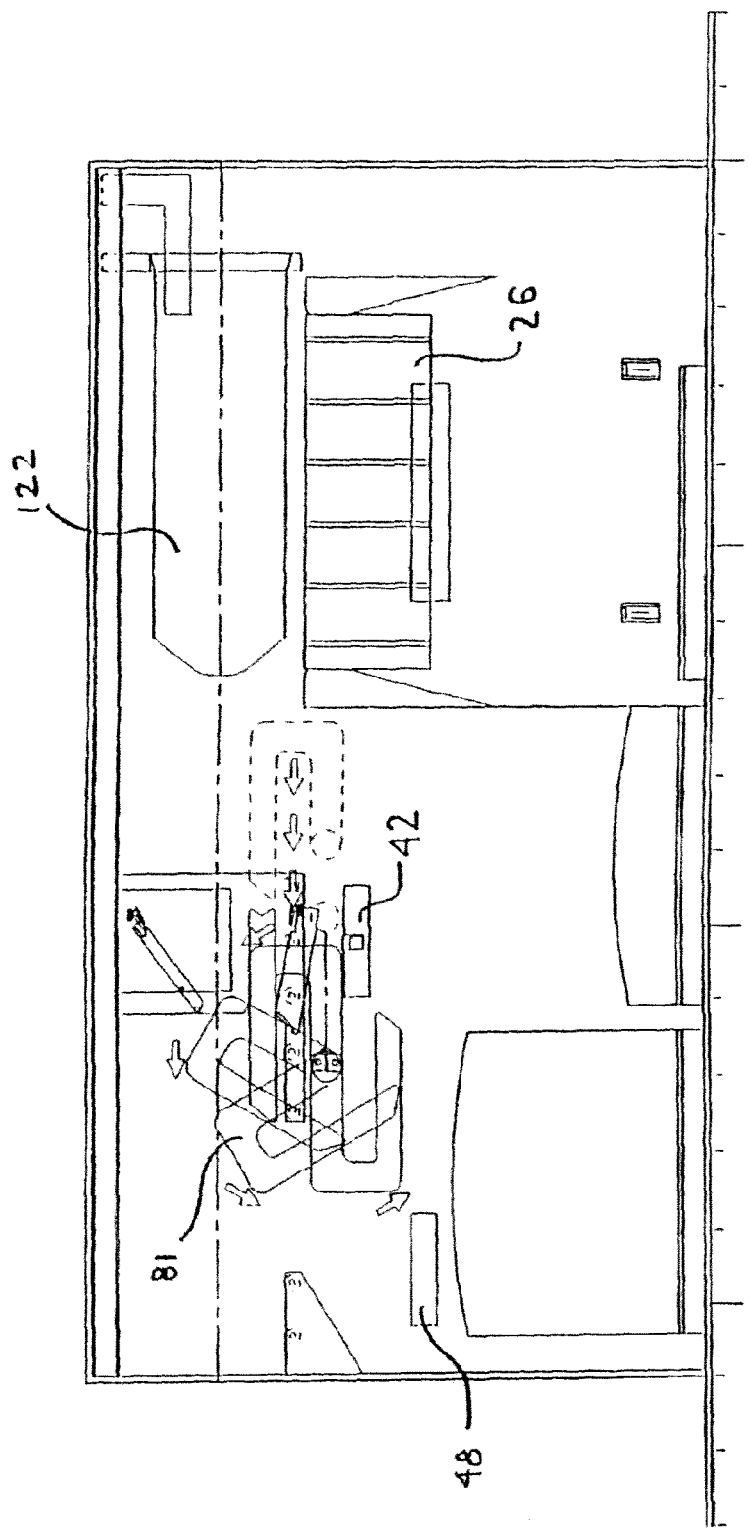

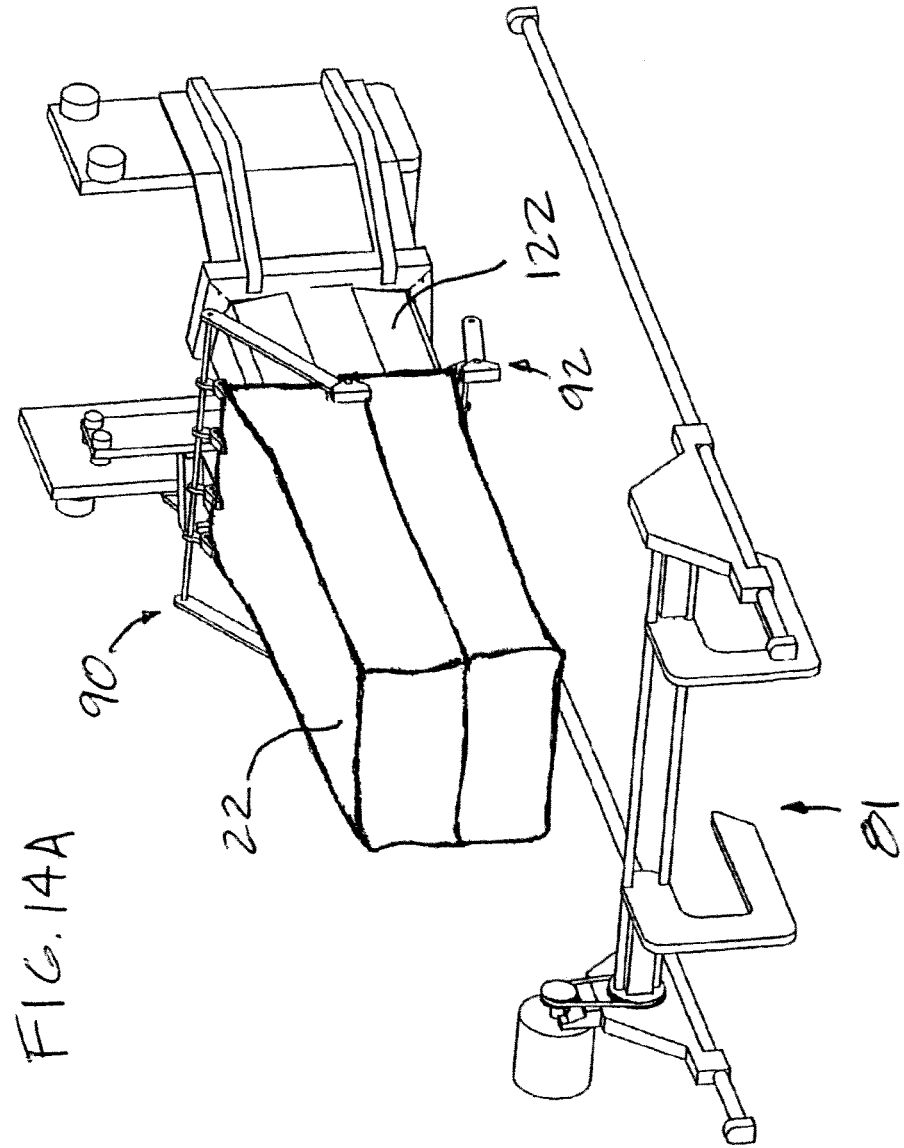

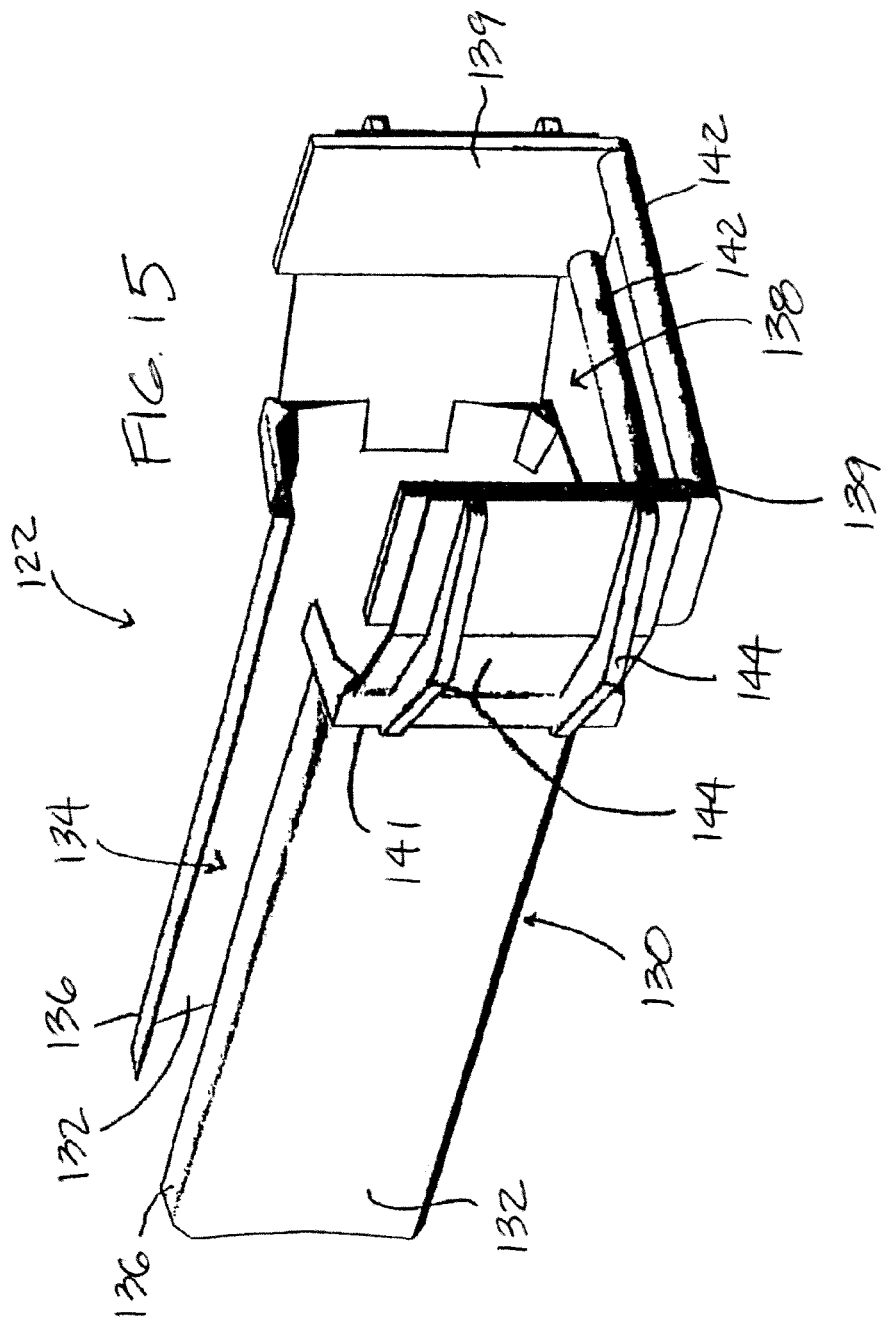

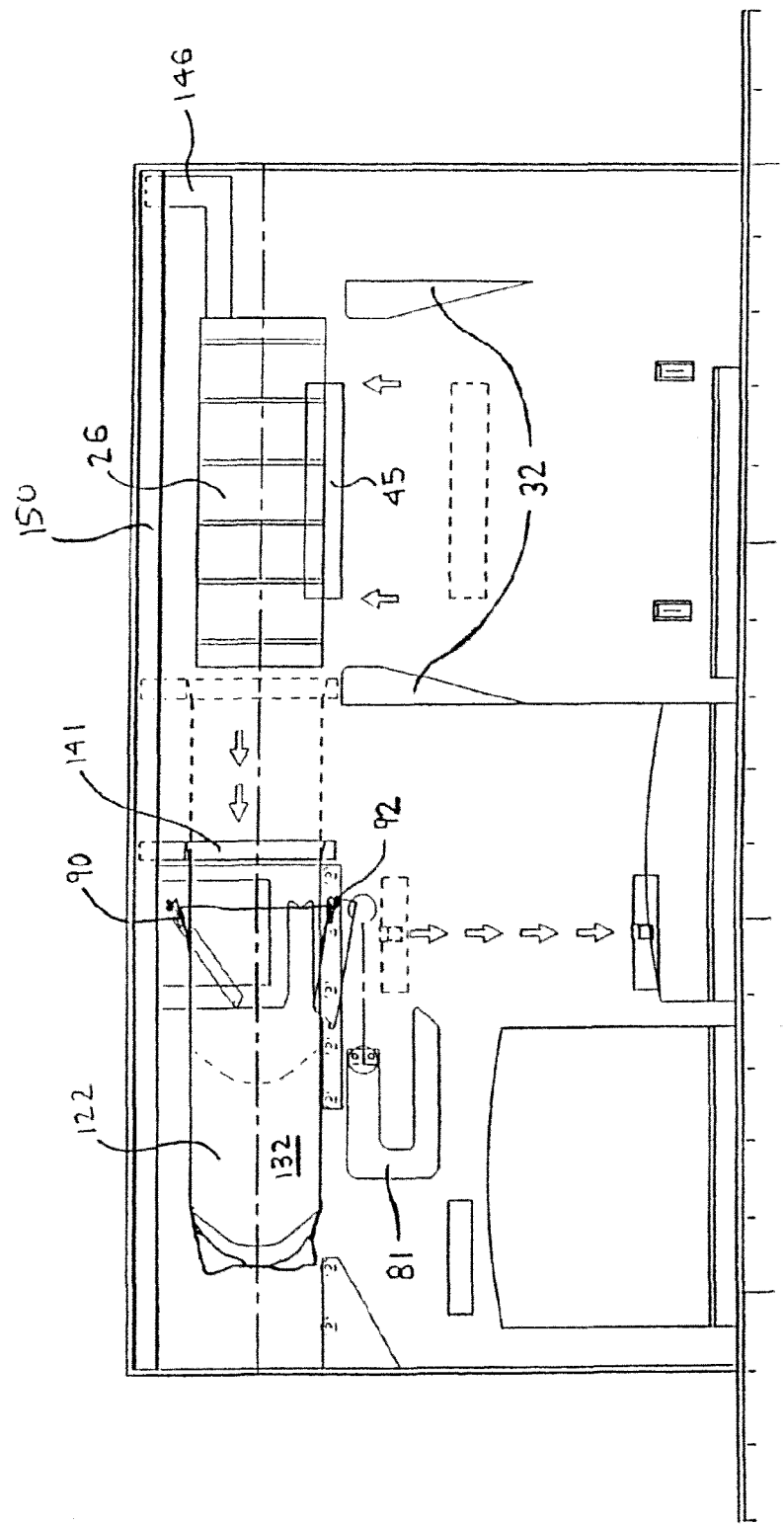

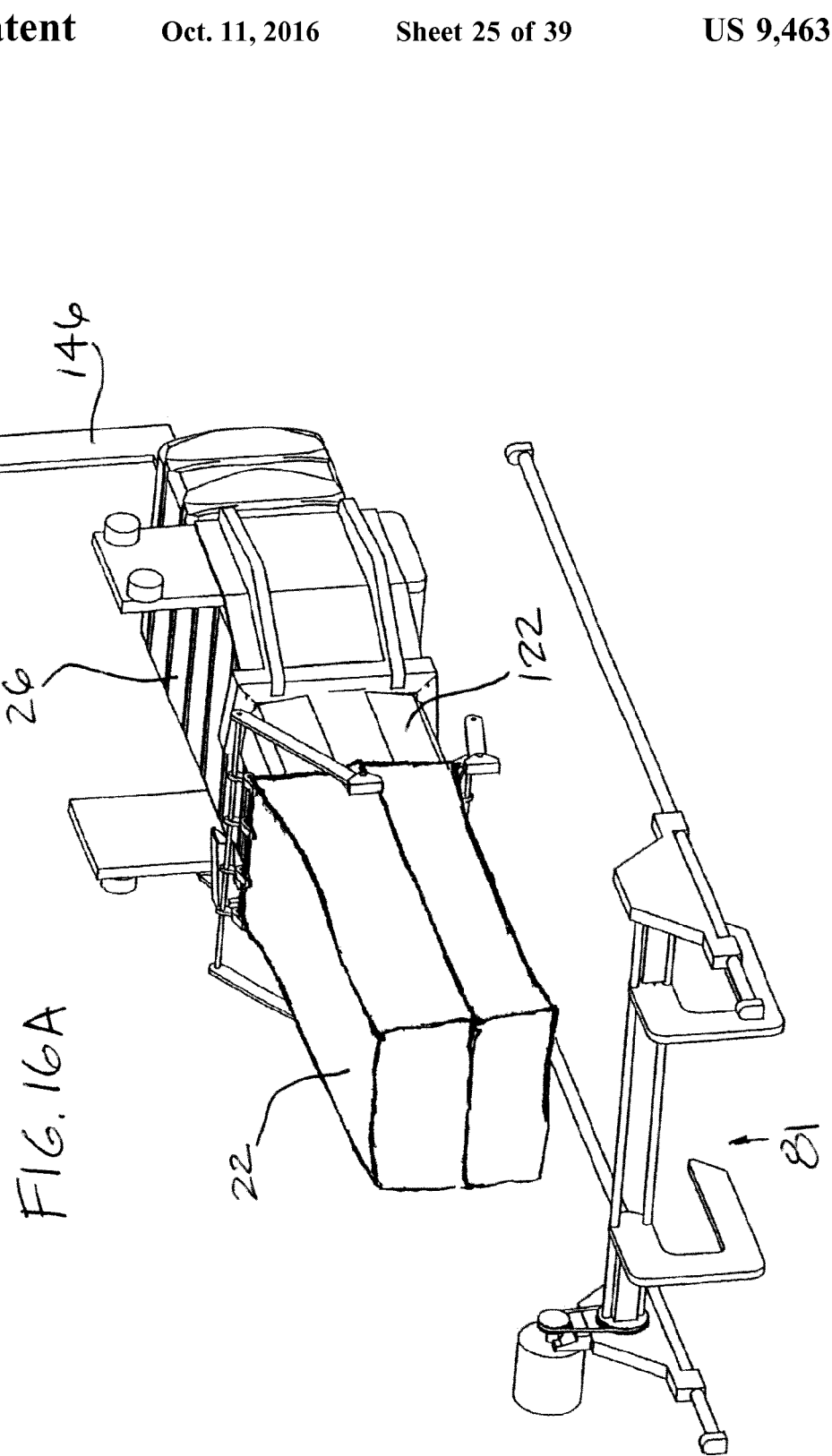

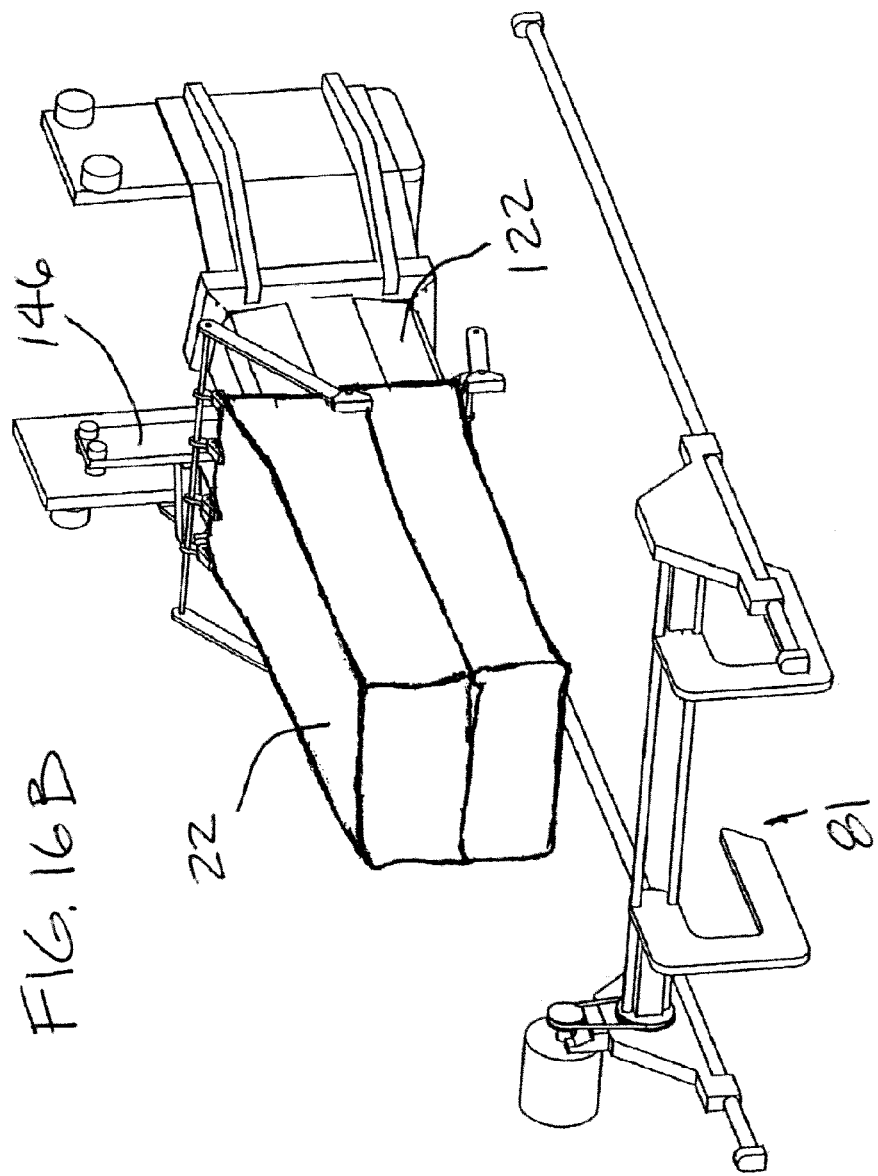

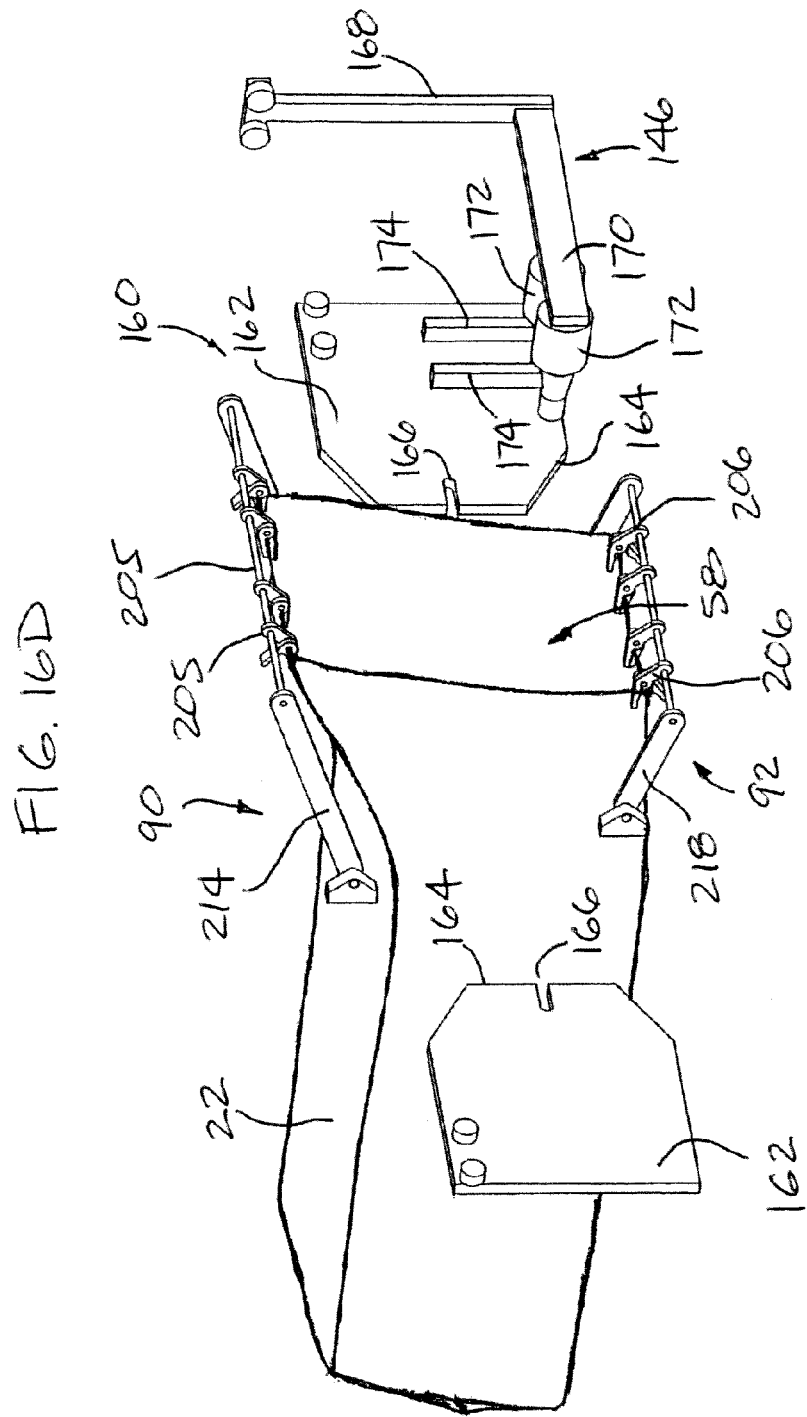

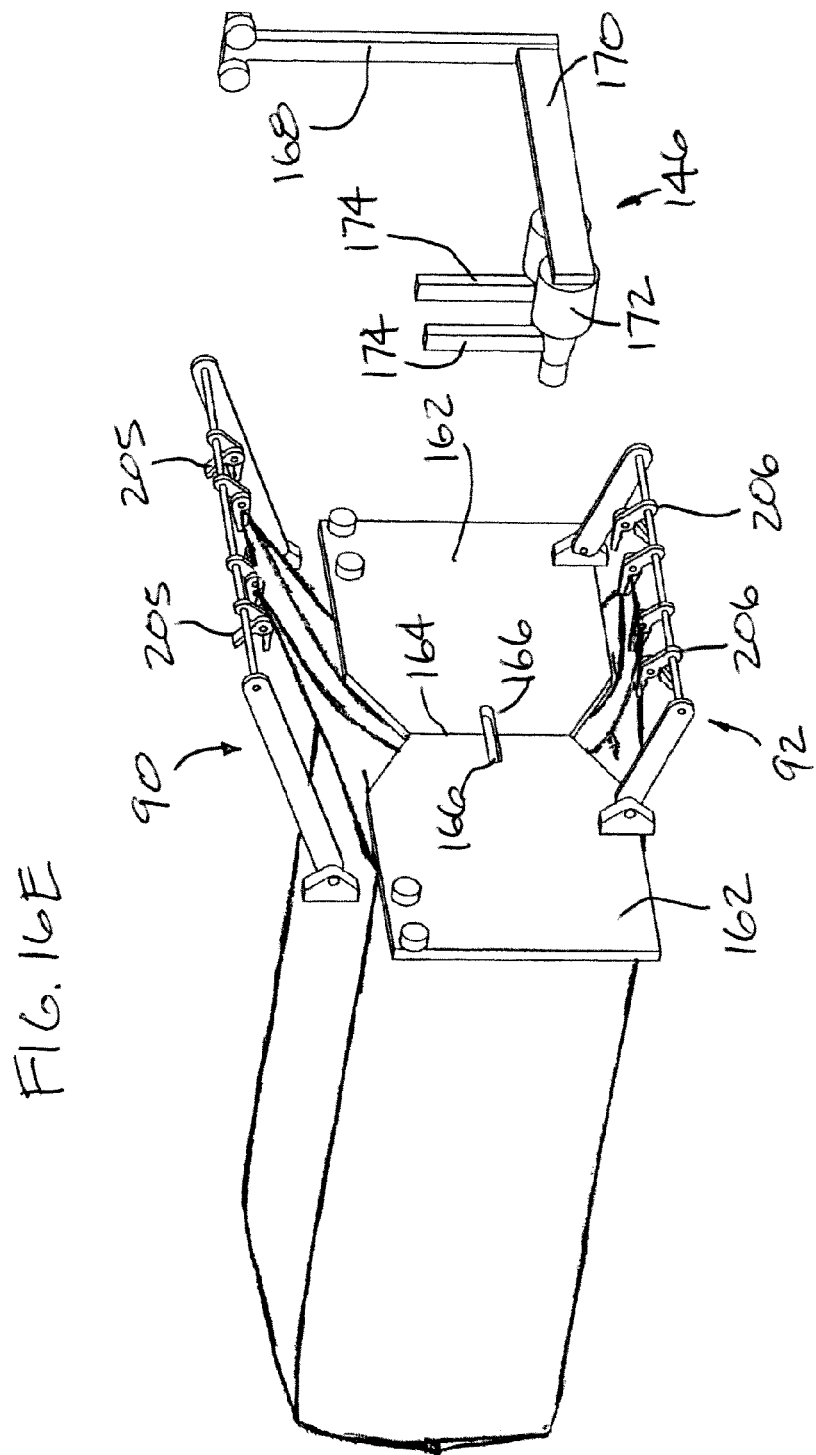

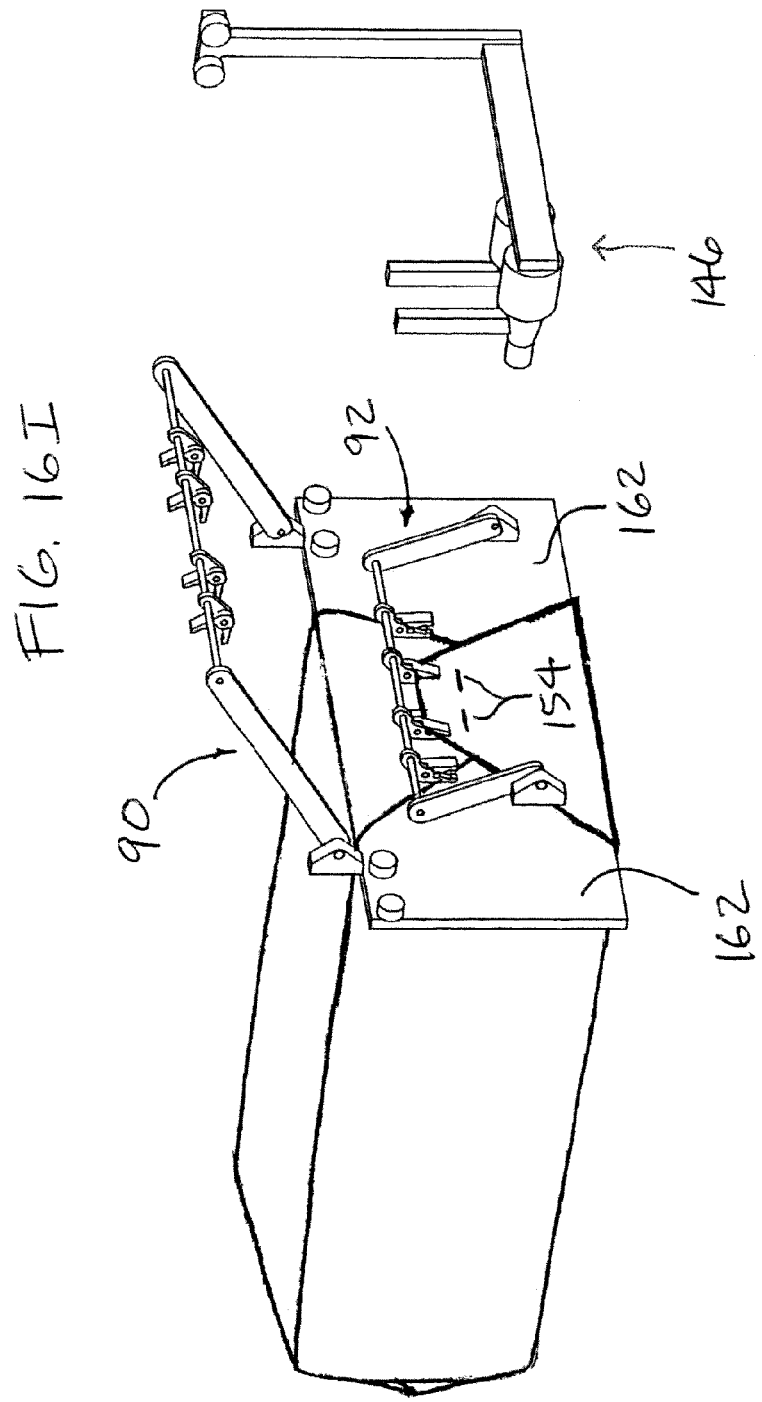

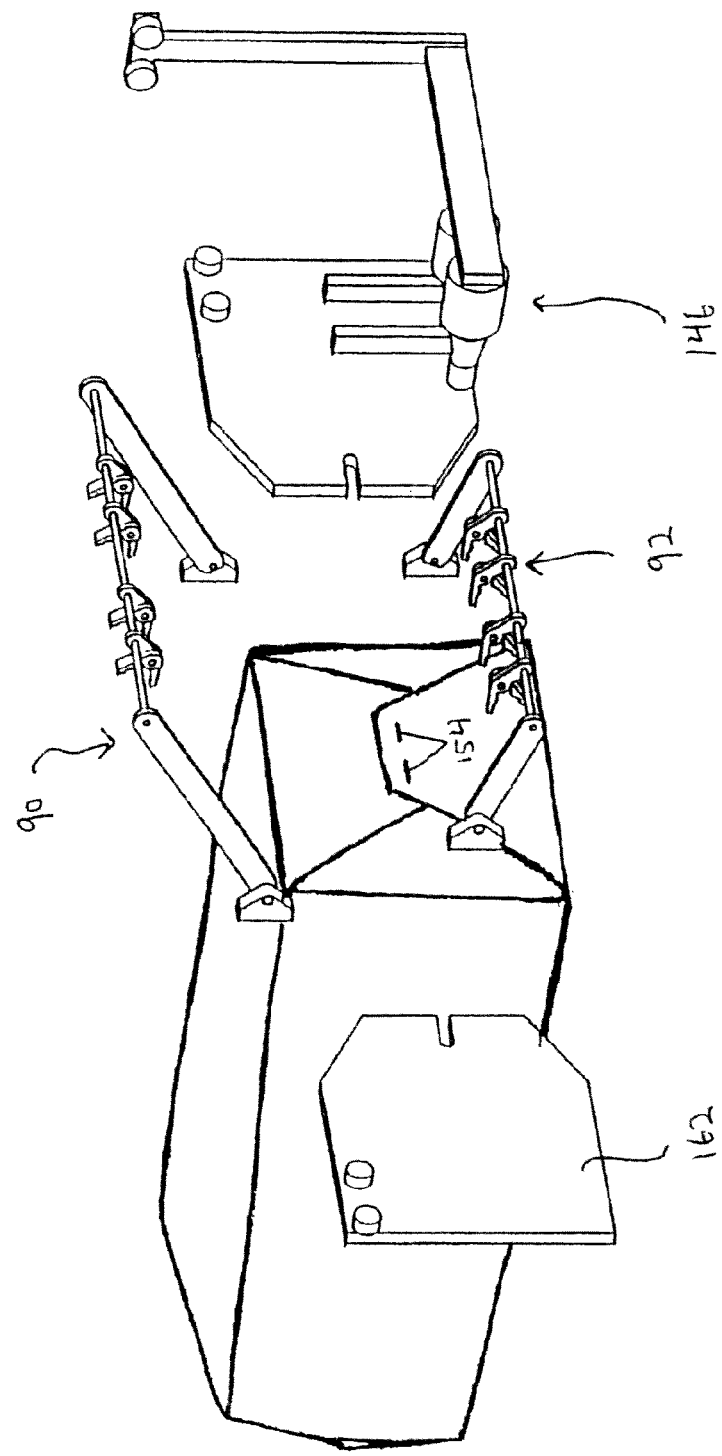

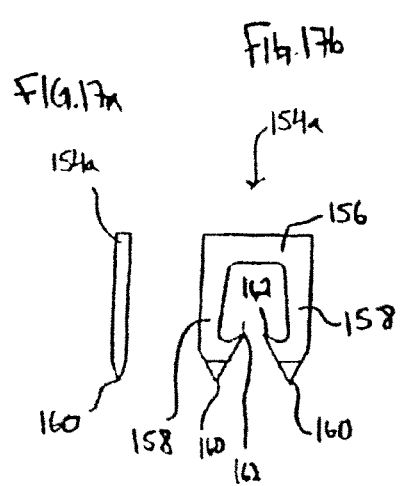
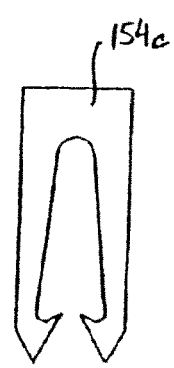
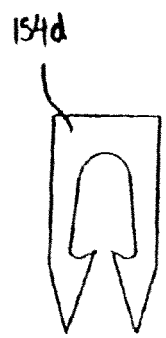
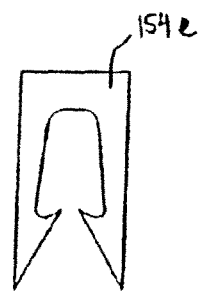
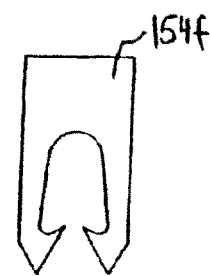

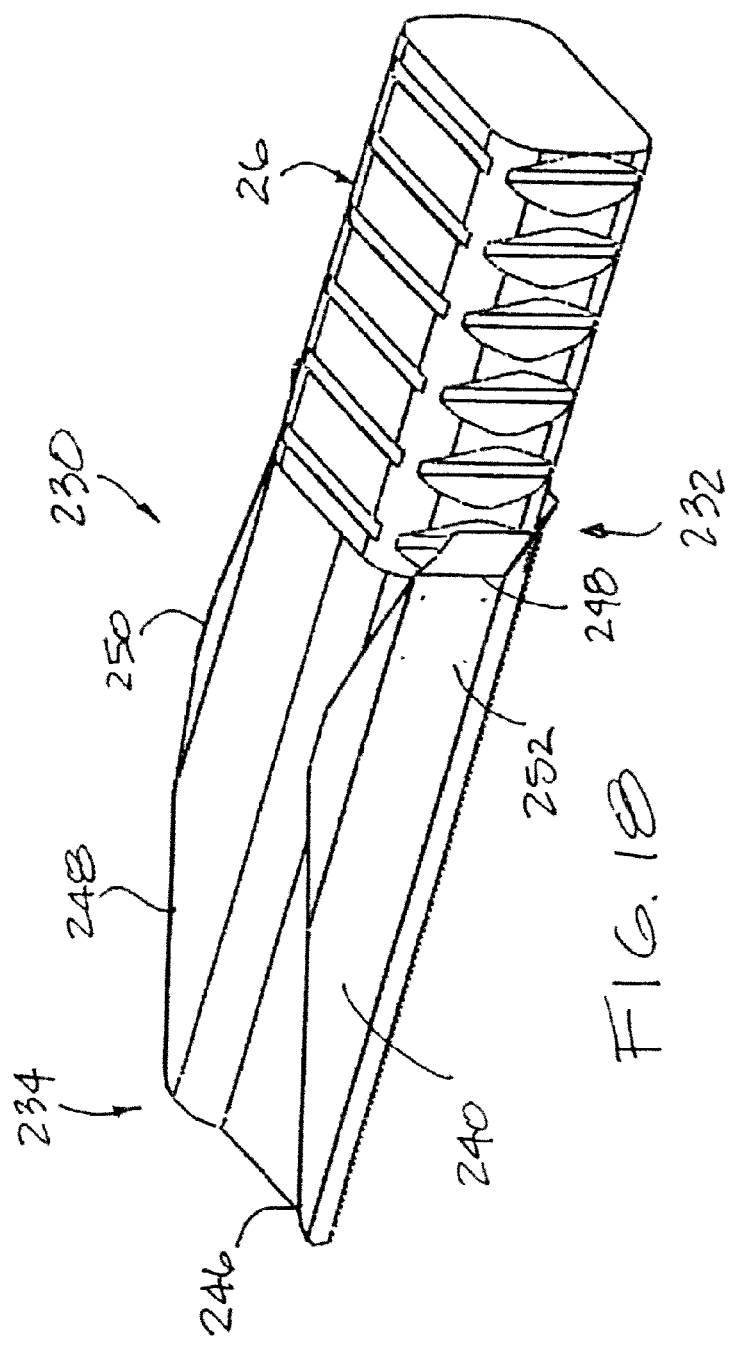

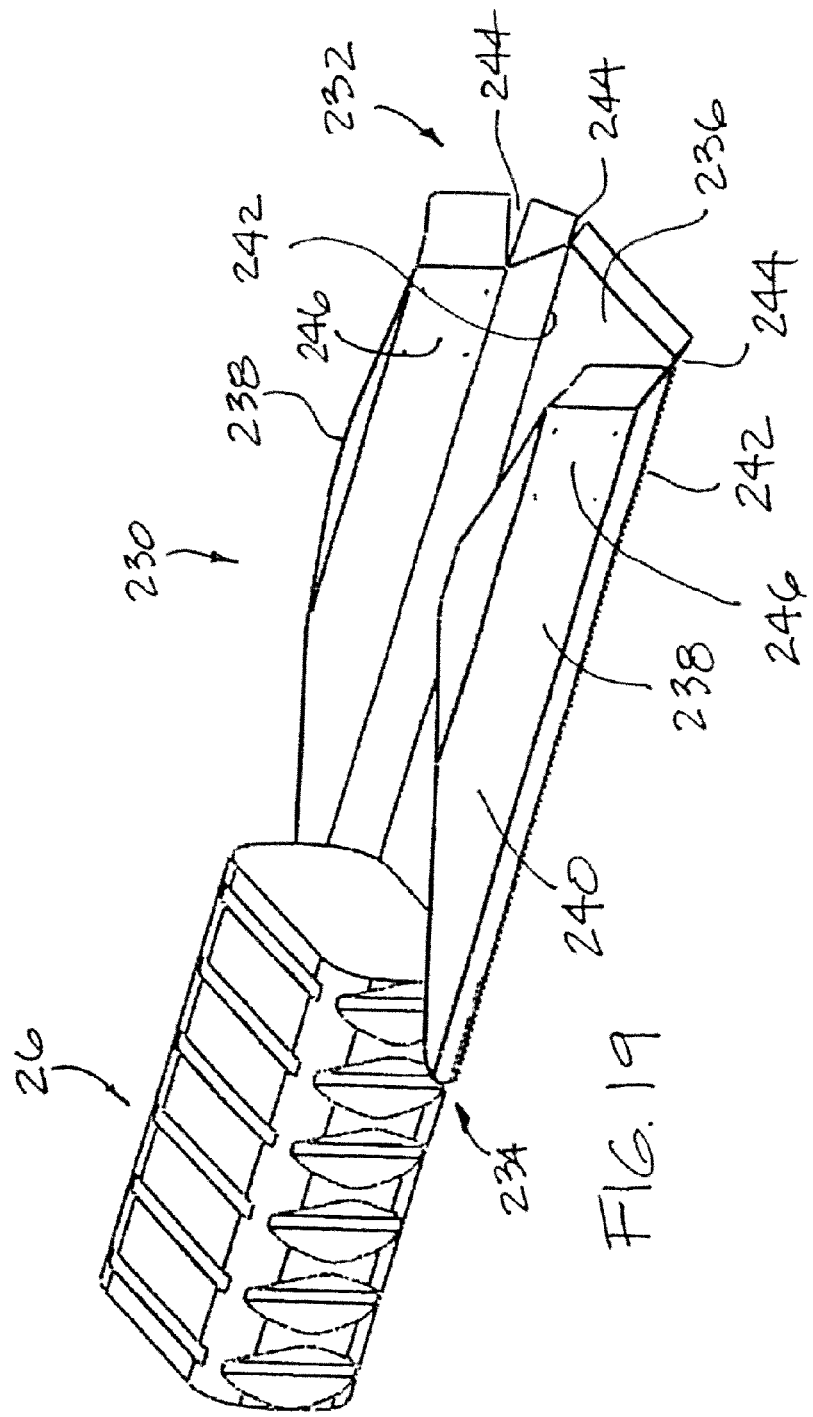

BAGGING ASSEMBLY

CROSS REFERENCE TO RELATED APPLICATION(S)

This is a continuation application of U.S. application Ser. No. 12/397,138 now U.S. Pat. No. 8,490,367, filed Mar. 3, 2009 which claims priority from provisional application No. 61/033,376, filed Mar. 3, 2008, entitled BAGGING ASSEMBLY, from provisional application No. 61/118,330, filed Nov. 26, 2008, entitled BAGGING ASSEMBLY, and from provisional application Ser. No. 61/118,175, filed Nov. 26, 2008, entitled BAG RETRIEVAL ASSEMBLY AND BAG FOR PRESSED BALES, the contents of all of which are expressly incorporated herein by reference for all purposes.

BACKGROUND

Conventionally, manual labor has been used to cover a bale of cotton or other fibrous material with a bag to protect the bale from damage or contamination during transport, and some instances to comply with trade requirements. To bag a bale using prior art methods, one or, more commonly, two or more workers must extend an open end of a bag over a bale chute in preparation for the bale to be inserted through the bale chute and into the bag. Additionally, the workers must hold the bag in position while the bale is inserted into the bag, preventing the workers from accomplishing other tasks during this time. Further, if a bale is not centered to enter the chute, the workers may attempt to move bales weighing up to 500 pounds, risking injuries and well as consuming time. Conventional bale bagging devices also contain numerous moving parts, on which workers may catch themselves or clothing, causing serious injuries, death, and/or property damage.

SUMMARY

A bagging assembly for bagging a pressed bale is provided including a chute comprising two spaced retaining structures defining a holding space and a channel therebetween, a bag positioning assembly for placing a bag around the chute, and a bag stuffing assembly for inserting the bale into the chute, wherein the chute is movable relative to the bag stuffing assembly.

In another exemplary embodiment, a bag sealing assembly is provided for sealing the bag once a bale has been inserted therein. Additionally, the bagging assembly may include also a bag removal assembly for removing the bagged bale from the bagging assembly and a bale positioning assembly to position the bale proximate to the chute before the bale is inserted into the chute and bag.

A further aspect of the present invention include a method for bagging a bale. Said method comprising using a bag positioning assembly on the bagging assembly to locate a bag in a position to received the bale; inserting a chute into the bag; using a bag stuffing assembly on the bagging assembly to insert the bale into the chute; and removing the chute from the bag.

A yet further aspect of the present invention comprises a bagging assembly for bagging a pressed bale comprising a bale elevator for raising a bale from a first position to a second higher position; a bag retriever assembly for retrieving a bag for bagging said bale raised by said bale elevator; a separator for opening an open end of said bag raised by said bag retriever, said separator rotatable about an axis of a rod; a chute for guiding said bale raised by said bale elevator into said bag retrieved by said bag retriever; and a bag stuffing assembly for pushing said bale raised by sale bale elevator into said chute and said bag retrieved by said bag retriever.

In still yet another aspect of the present invention, a bagging assembly for bagging a pressed bale is provided comprising a chute having a receiving end for facilitating insertion of a pressed bale into a bag; said chute comprising a one piece continuous center section having two side sections extending therefrom; the two side sections being spaced from one another and each having a radially outwardly flared section at the receiving end of the chute.

Still other aspect of the invention include a bagging assembly for bagging a pressed bale comprising a chute defining a cavity for sequentially receiving pressed bales positioned at a first elevation relative to a framed assembly of the bagging assembly and being movable between a position closer to a first side of the framed assembly and a position closer to a second side of the framed assembly. The assembly further comprises a bag retrieval system for retrieving bags positioned at a second elevation relative to the framed assembly and a plurality of bags for use to bag pressed bales located at a third elevation relative to the framed assembly; and wherein the third elevation is lower than the second elevation.

Other aspects and variations of the bale bagging assemblies summarized above are also contemplated and will be more fully understood when considered with respect to the following disclosure.

BRIEF DESCRIPTION OF THE DRAWINGS

FIGS. 3-7 are side schematic views of the bagging assembly of FIG. 1 showing bagging steps of bagging a bale according to exemplary embodiments of the present invention.

FIGS. 8A-8C are schematic orthogonal views of an exemplary positioner of the bagging assembly of FIG. 1.

FIGS. 9-11 are side schematic views of the bagging assembly of FIG. 1 showing bagging steps of bagging a bale according to exemplary embodiments of the present invention.

FIG. 11A is a schematic orthogonal view of the positioner of FIG. 8A in a rotated position.

FIG. 12 is a schematic orthogonal view of a positioner and bag expansion assemblies according to aspects of the present invention.

FIG. 12A is a side view of the positioner of FIG. 8A having a bag attached thereto.

FIGS. 13 and 13A are a schematic orthogonal view and a side view, respectively, of a positioner disengaging from a bag according to aspects of the present invention.

FIGS. 13B and 13C are a schematic orthogonal view and a side view, respectively showing further bagging steps according to aspects of the present invention.

FIGS. 14 and 14A are a schematic orthogonal view and a side view, respectively showing further bagging steps according to aspects of the present invention.

FIG. 15 is an orthogonal view of an exemplary chute of the bagging assembly of FIG. 1.

FIG. 16 is a side schematic view of the bagging assembly of FIG. 1 showing a bagging step of bagging a bale according to an exemplary embodiment of the present invention.

FIGS. 16A and 16B are schematic orthogonal views of bagging steps of bagging a bale according to aspects of the present invention.

FIGS. 16D-16K are schematic orthogonal views of a bag sealing assembly and bag sealing steps according to aspects of the present invention.

FIGS. 17a and 17b are a side view and a top view, respectively, of an exemplary staple according to aspects of the present invention.

FIGS. 17c-17f are other exemplary embodiments of staples according to aspects of the present invention.

FIGS. 18 and 19 are schematic views of an alternative chute provided in accordance with aspects of the present invention.

DETAILED DESCRIPTION

Figure 1:
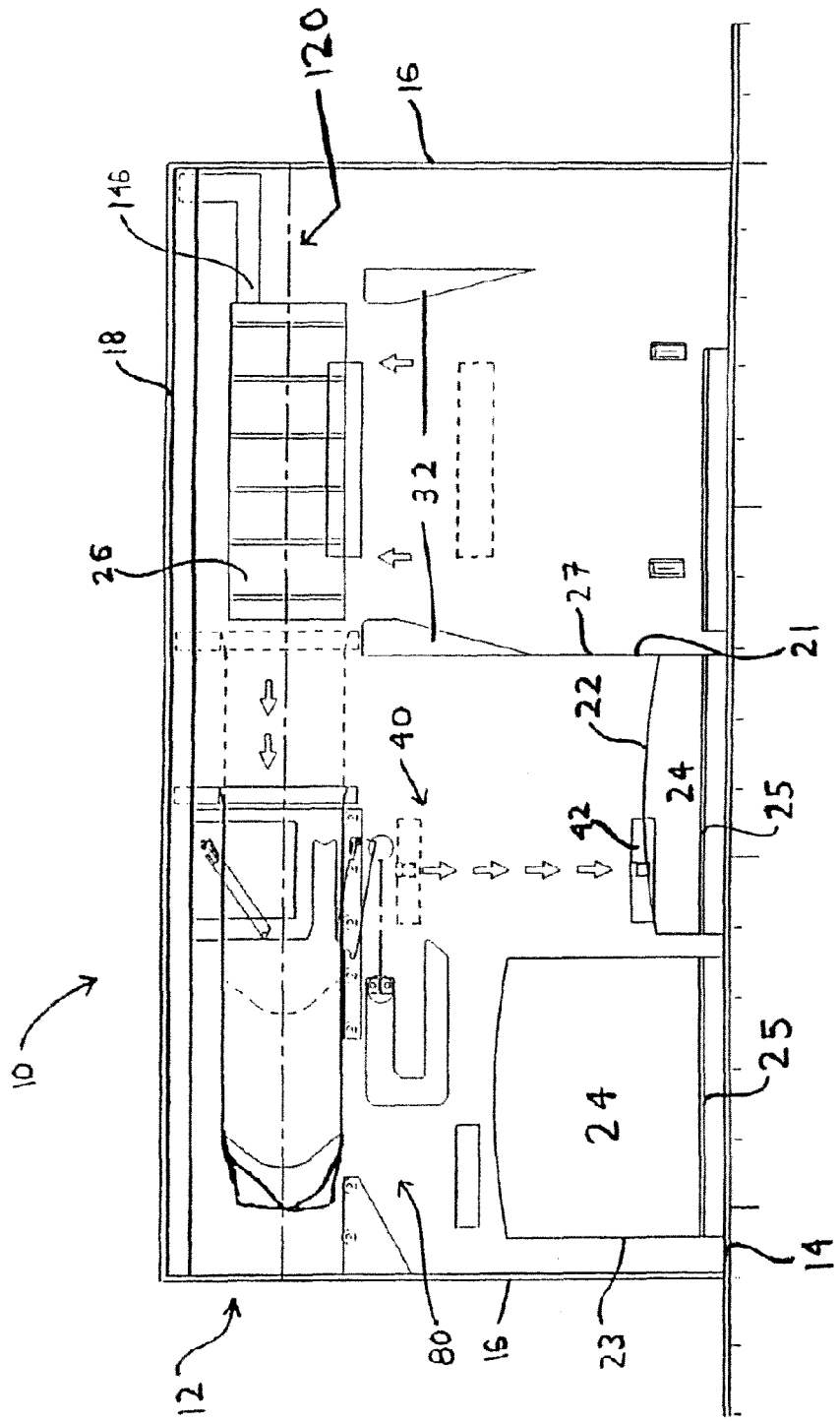
FIG. 1 is a side schematic view of an exemplary embodiment of a bagging assembly according to aspects of the present invention.

With reference to FIG. 1, a bagging assembly 10 in accordance with exemplary embodiments of the present invention is provided to efficiently and effectively insert an uncovered bale of fibrous material into a bag, seal the bag, and transport the sealed bag from the bagging assembly.

Referring now to FIG. 1, an exemplary embodiment of a bagging assembly 10 includes a system area 12, which houses various bale bagging components generally referred to herein as a housing, having a base 14, that may be a floor or a slab or a foundation, side walls 16, that may be metal, plastic, wood or steel frames or steel beams, and a top wall 18, that may be a roof of a building or an upper frame or beam. Although the housing 12 represented in FIG. 1 is an open space, a confined space for containing the components of the bagging assembly 10 or a different type of housing structure may be practiced without deviating from aspects of the present invention.

The bagging assembly 10 includes, within the housing 12, a bag retrieval assembly 40 for retrieving bags from a stack of bags 24, a bag positioning assembly 80 for opening the bag and preparing the bag on the chute 122 (FIG. 5) to receive a bale, and a bag stuffing assembly 120 for inserting the bale into the bag, as will be described in more detail below. Generally, the bagging assembly 10 operates continuously to retrieve a bag 22 from a stack of bags 24, position the bag to receive a bale 26, insert the bale into the bag, and seal the bag. As shown in the figures, the bagging assembly 10 may operate on more than one bale 26 simultaneously, but, for clarity, a description of operation of the bagging assembly will generally follow a full "bagging cycle" of a single bale from beginning to end. Optionally, the assembly 10 may be configured as a batch process and only work on one bale at a time.

As shown in FIG. 1, the bagging assembly 10 comprises first and second bag bins 21, 23 configured for holding a bag stack 24 of a plurality of bags 22 to be supplied to the bag retrieval assembly 40. Providing two bag bins 21, 23 allows the second bag bin to efficiently replace the first bag bin when the first bag bin is emptied thus allowing the bagging assembly 10 to continuously operate by using bags 22 supplied by the second bag bin while the first bag bin is being restocked, i.e., to minimize or eliminate down-time.

Thus, the first bin 21 may be considered an operating bin while the second bin 23 a backup bin. However, one of ordinary skill in the art will appreciate that the bagging assembly 10 may operate with only a single bag bin. In one exemplary embodiment, when the operating bin 21 is emptied, it is removed or moved out of the way and back up bin 23 moved over to assume the position of the operating bin. In one embodiment, movement of the bins may be done manually, either with a lift truck, pallet jack or a forklift, or through automatic loading and unloading mechanisms (not shown, such as a movable platform, belt or conveyor system). Still alternatively, the bag retrieval assembly 40 may pick up a bag from any of the two stacks 21, 23 without having to wait for one of the bins to first go empty. In one exemplary embodiment, each bag bin 21, 23 comprises side walls 27 for containing bags 22 therein, such as a four-sided box, or it may simply embody a palette. The bags 22 are stacked in the first bag bin 21 such that an open end 58 (FIG. 3) of each bag is orientated in the direction of the second bag bin 23. Bags are normally folded at least once to simplify shipping to the user, however this is not required. As shown in the figures, the first bag bin 21 supplying bags 22 to the bag retrieval assembly 40 may be positioned to abut a side surface of a bale guide 32. Alternatively, the bag bins 21, 23 may be positioned at any location within reach of the bag retrieval assembly 40 and the opening of each bag may alternate in two or more different directions so that the bag retrieval assembly 40 has to move or re-position to grab an appropriate end of each bag. Most preferably, the bags are placed below, elevation-wise, the bag retrieval system 40. Alternatively, the bags are placed above, elevation-wise, the bag retrieval system 40. Still alternatively, the bags are provided in the form of a rolled stack of bags.

Figure 2:
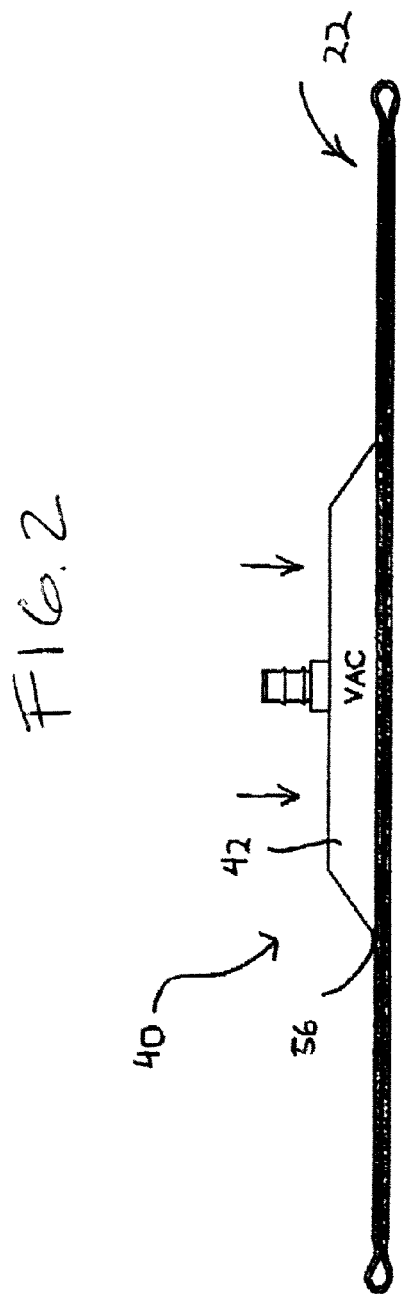
FIG. 2 is a schematic view of an exemplary bag retriever of the bagging assembly of FIG. 1.

With continued reference to FIG. 1 and also now with reference to FIG. 2, in one embodiment the bag retrieval assembly 40 includes a moveable bag retriever 42 comprising a head adapted to retrieve the bag 22. In certain embodiments, the moveable bag retriever 42 is a robot arm for picking up and delivering bags to the bag positioning assembly 80 while in other embodiments, the moveable bag retriever is a Cartesian coordinate robot. Aspects of a robot arm and a Cartesian coordinate robot for picking up bags are disclosed in Ser. No. 61/118,175, the contents of which are expressly incorporated herein by reference for all purposes. In an initial position, as shown in phantom in FIG. 1, the bag retriever 42 is located above the first bag bin 21 and configured to be lowered onto the bag stack 24 to retrieve the bag 22 on top of the stack. The bag retriever 42 may move vertically on a guide, track, or rail, powered by, for example, a motor with belt or chain, or a pneumatic or hydraulic cylinder. The bagging assembly 10 may be controlled by a computer, vector drives, servo drives, electro mechanical sensors and/or other common control devices known within the art. These controllers may be closely placed, producing a master control center, or each device may have its own controller, wherein signals coordinate functions between systems. The bag retriever 42 may be positioned such that one edge of the bag retriever is generally aligned with the open end 58 (FIG. 3) of the top bag 22 when the bag retriever is lowered from its initial position to a retrieval position as indicated by the arrows. When the bag retriever 42 encounters the top bag 22, a bag attachment mechanism on the bag retriever secures the bag to a bottom surface 50 of the bag retriever. In one exemplary embodiment, the bag attachment mechanism is a vacuum device capable of generating an effective amount of vacuum so that as the bag retriever is raised, the bag is held by vacuum force and rises with the device. In one embodiment, a sensor is incorporated in the retriever 42 so that as it contacts the bag 22, a signal is sent to a controller to activate a vacuum to enable the bag retriever to "grab" the bag. A plurality of vacuum cups may be used to further ensure that a bag is retrieved. It will be appreciated, however, that suction cups, a perforated vacuum plate, or any other device suitable to allow the bag 22 to be removably attached to the bag retriever 42 may also be used as the bag attachment mechanism instead of or in addition to a vacuum device. For example, articulating fingers mounted on a robotic arm may be used to grab the individual bags or alternatively a Cartesian coordinate robot may be used as disclosed in provisional application Ser. No. 61/118,175.

Figure 3:
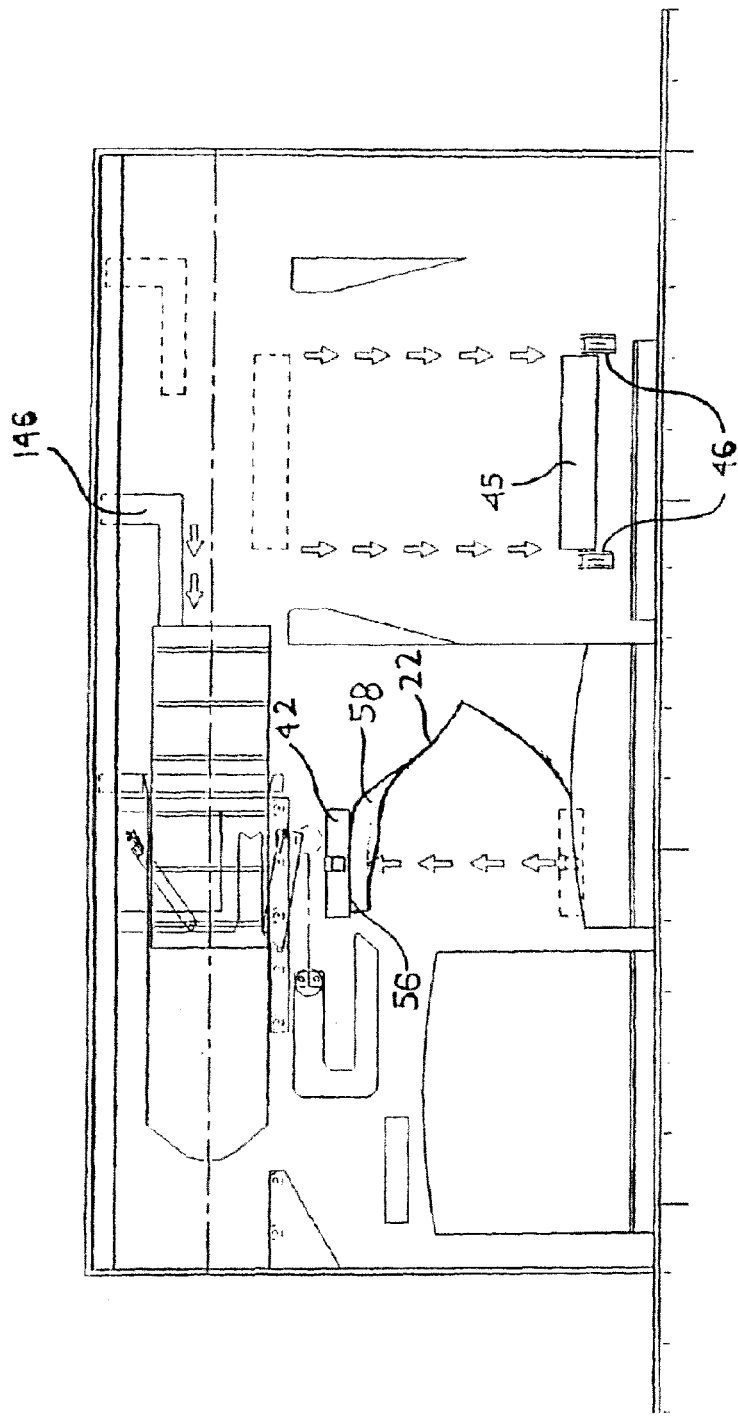

With reference now to FIG. 3, once the bag 22 has been secured to the bag retriever 42, the bag retriever retreats up to its initial position, thereby lifting the bag from the bag stack 24. As the bag retriever 42 ascends, a bale elevator 45 simultaneously descends from an upper delivery position (shown in phantom) to a lower receiving position as indicated by the arrows. In one embodiment, a scissor lift mechanism with a support surface may be used to raise and lower the bales. As one of ordinary skill in the art will appreciate, a hydraulic, pneumatic, or electro-mechanical cylinder or motor with a belt/chain may also be used to raise or lower the support platform and the bale elevator 45, may move along rails, guides, tracks, or other suitable transportation means. In one exemplary embodiment, the bale elevator 45 is configured to stop at multiple positions on its way to an upper delivery position to allow operation on the bale before it is bagged, including grading, moisture testing, sample cutting, sample pulling, sizing, checking for missing bale ties, and other operations necessary for the storage, marketing, and protection of the product. Thus, an aspect of the present invention is a bale bagging assembly comprising a bag retriever movably positioned within a framed structure of the bagging assembly at a first elevation; and wherein a plurality of bags are positioned below the bag retriever at a second lower elevation.

In one exemplary embodiment, a blade or roller knife, like a pizza-pie cutter, protruding a set amount from a base position may be used to cut the bale as the bale is raised. As one of ordinary skill in the art will appreciate, any suitable device to move the blades vertically and/or horizontally over the bale to effectively cut the sample could be used. Still furthermore, the blades may be powered to provide added translating or rotating capability for cutting or sawing type motion. Once the strapped bale is cut, the cut sample or samples may be grabbed and processed in the manner disclosed in Provisional Application No. 61/023,812, entitled BALE SAMPLER, filed Jan. 25, 2008, the contents of which are expressly incorporated herein by reference for all purposes. The mechanism for grabbing the cut sample(s), as taught in the '812 application, may be placed at a location in the bagging assembly so that the cut samples are grabbed prior to the stuffing assembly 120 pushing and stuffing the strapped bale into a bag for bagging.

Figure 20:
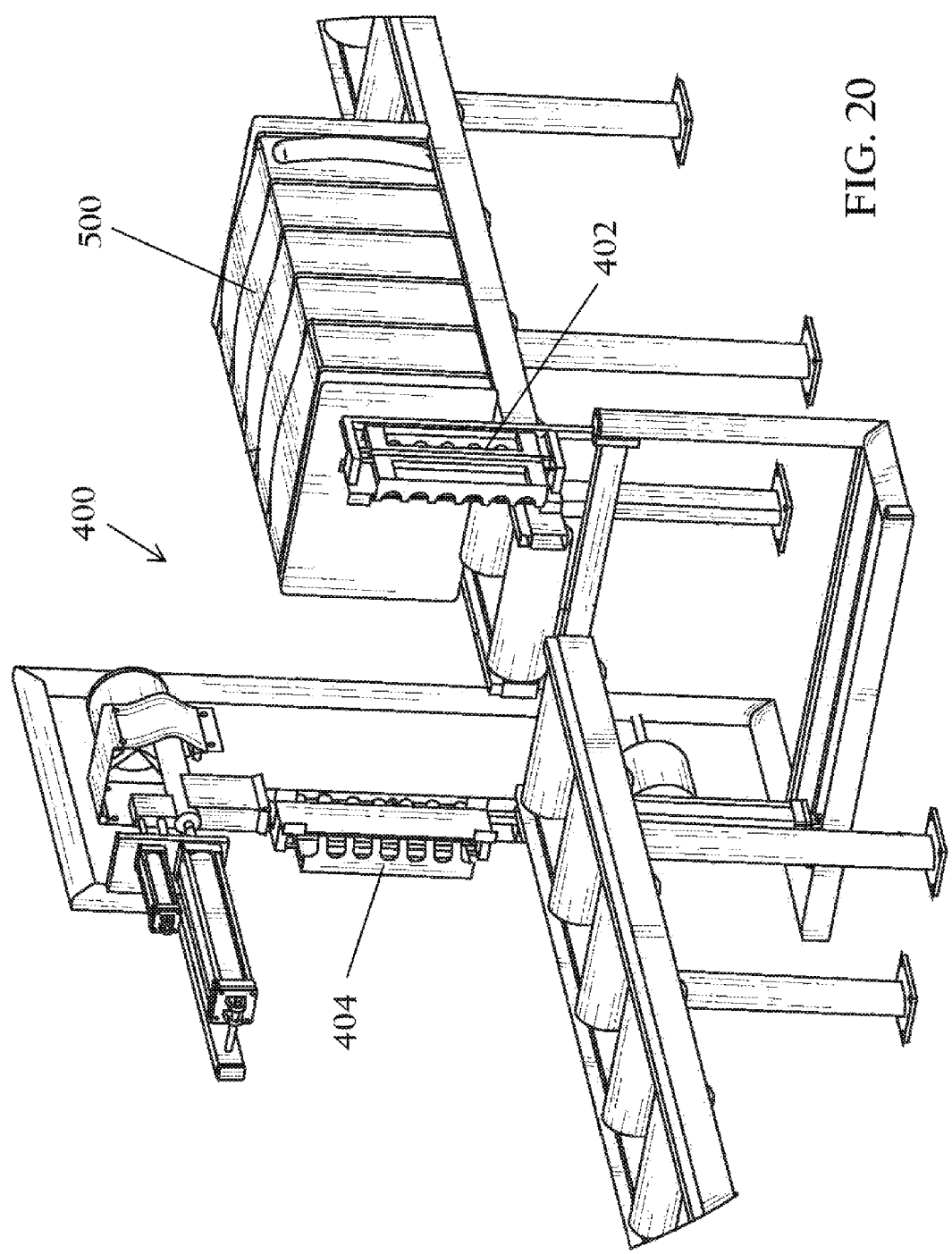
FIG. 20 is a schematic diagram showing a bale sampling device or assembly.

FIG. 20 shows a bale sampling device or assembly 400 as disclosed and described in the '812 application, noted immediately above. As shown, the bale sampling device 400 comprises a first gripper 402 and a second gripper 404 having gripping edges for gripping a bale sample from a bale 500, as described in the '812 application.

Figure 5:
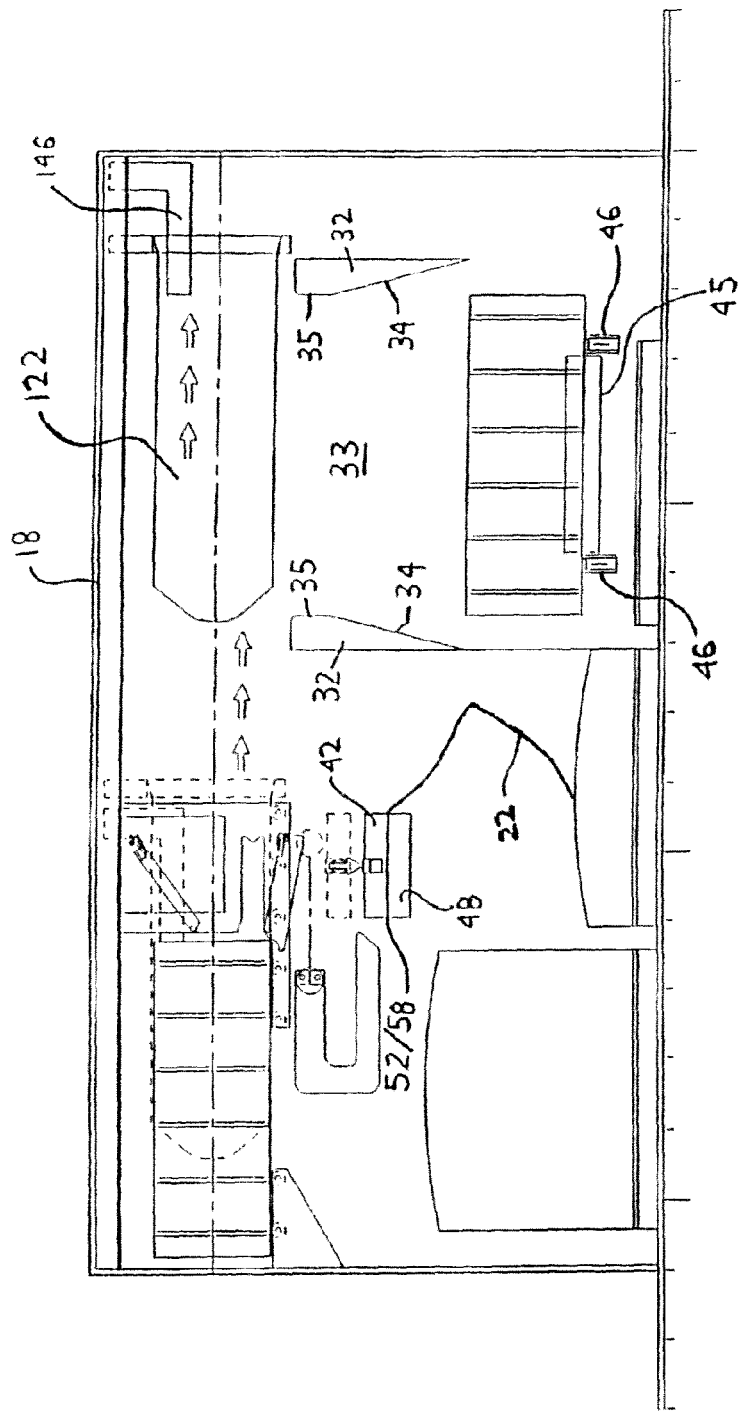

In the lowered receiving position, the bale elevator 45 is located to receive a bale 26 (FIG. 5) from a bale conveyor, or another bale transport means such as a forklift or a hand truck. As shown in FIG. 3, the bale elevator 45 is positioned between rails 46 of a bale conveyor such that the bale conveyor can transport the bale 26 directly onto the bale elevator (FIG. 5). In one exemplary embodiment, the support surface of the bale elevator 45 comprises a generally rectangular platform with a length and width sized to sufficiently support a conventional bale 26. However, one of ordinary skill in the art will appreciate that a specific surface area of the bale elevator 45 is not critical as long as the bale elevator can support a bale 26. In one exemplary embodiment, the bale may be delivered by external conveyer to the raised position, eliminating the need for a bale elevator 45.

Figure 4:
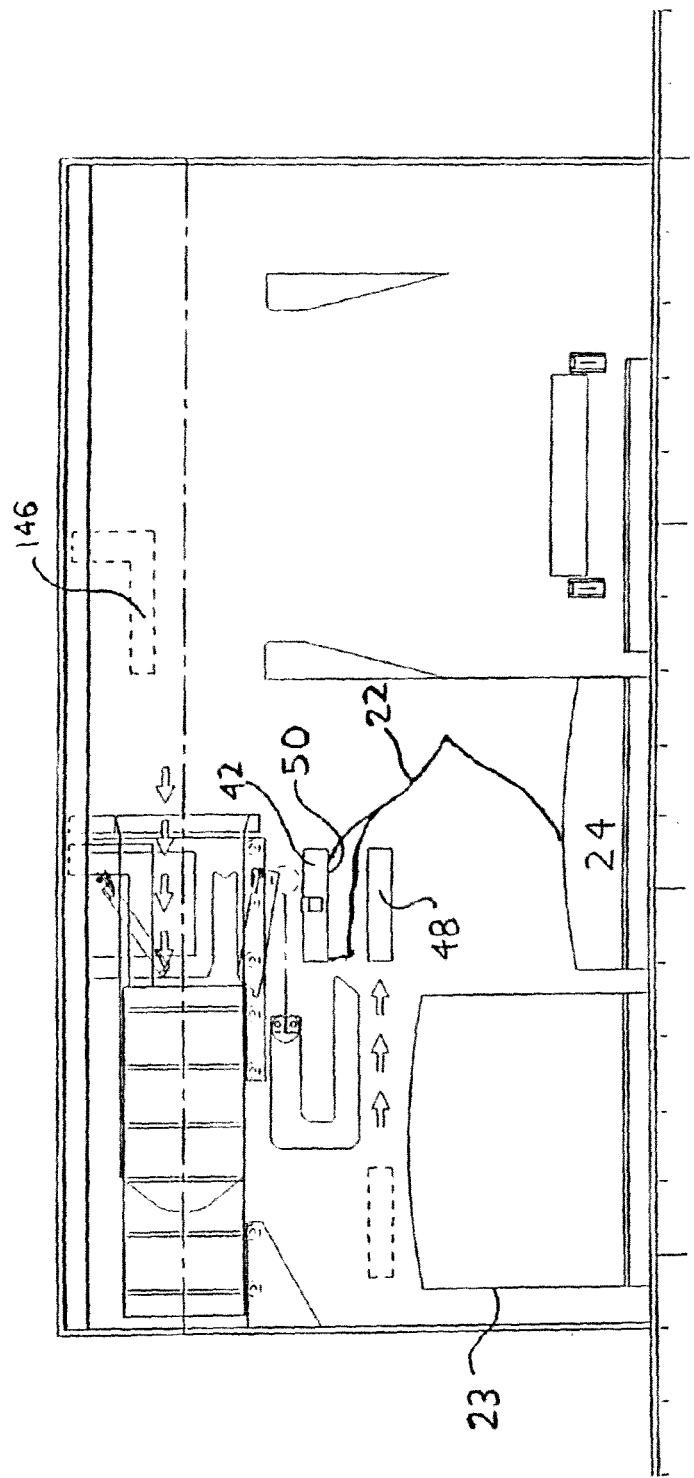

Referring now to FIG. 4, a lower bag separator 48 is located generally away from a line of movement of the bag retriever 42 during the retrieving action of the bag retriever, such as in a stowed position (shown in phantom) near the second bag bin 23. The lower bag separator 48 comprises a head and is laterally moveable on a swing arm, a track, or guide between its stowed position and a use position. Further, the lower bag separator 48 has a bag attachment mechanism, such as a vacuum, suction cups, or any other suitable attachment device, similar to the bag retriever 42. When the bag retriever 42 returns to its initial position with a bag 22 attached to its bottom surface 50, the lower bag separator 48 moves laterally from its stowed position to its use position such that it is spaced from, but generally aligned with the bag retriever 42.

With reference now to FIG. 5, when the lower bag separator 48 reaches its use position, the bag retriever 42 having the bag 22 attached to its bottom surface 50 is lowered toward the lower bag separator, sandwiching the open end 58 of the bag 22 between the bottom surface of the bag retriever and a top surface 52 of the lower bag separator 48. With the bag retriever 42 and the lower bag separator 48 in this configuration, a controller activates the bag attachment mechanism on the top surface 52 of the lower bag separator 48 to allow the lower bag separator to attach to the open end 58 of the bag 22. Movement of the lower bag separator to the used position and subsequent movement of the bag retriever may be implemented using a motorized drive chain or a piston cylinder and through a timer, a proximity switch, a magnetic switch or other devices known in the art can be located and properly sequenced to perform the necessary tasks. In an alternative embodiment, a lower bag separator is not used. Instead, a blast of air or gravity is relied on to permit the lower edge of the bag opening to drop or open to accommodate the arm of the bag positioning assembly, as further discussed below. An exemplary embodiment in which a lower bag separator 48 is not used is disclosed in provisional application Ser. No. 61/118,175, the contents of which were previously incorporated by reference.

Figure 6:
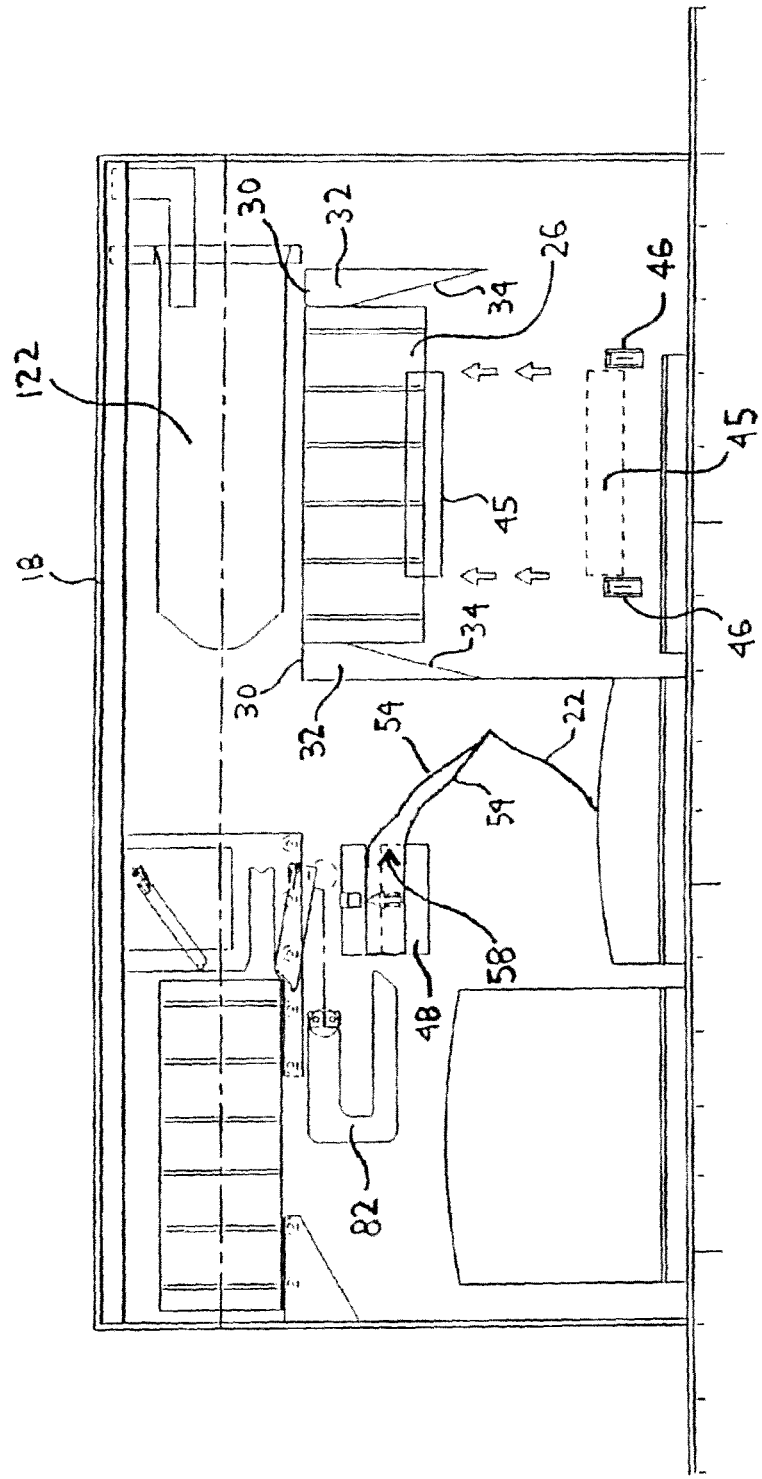
Figure 10:
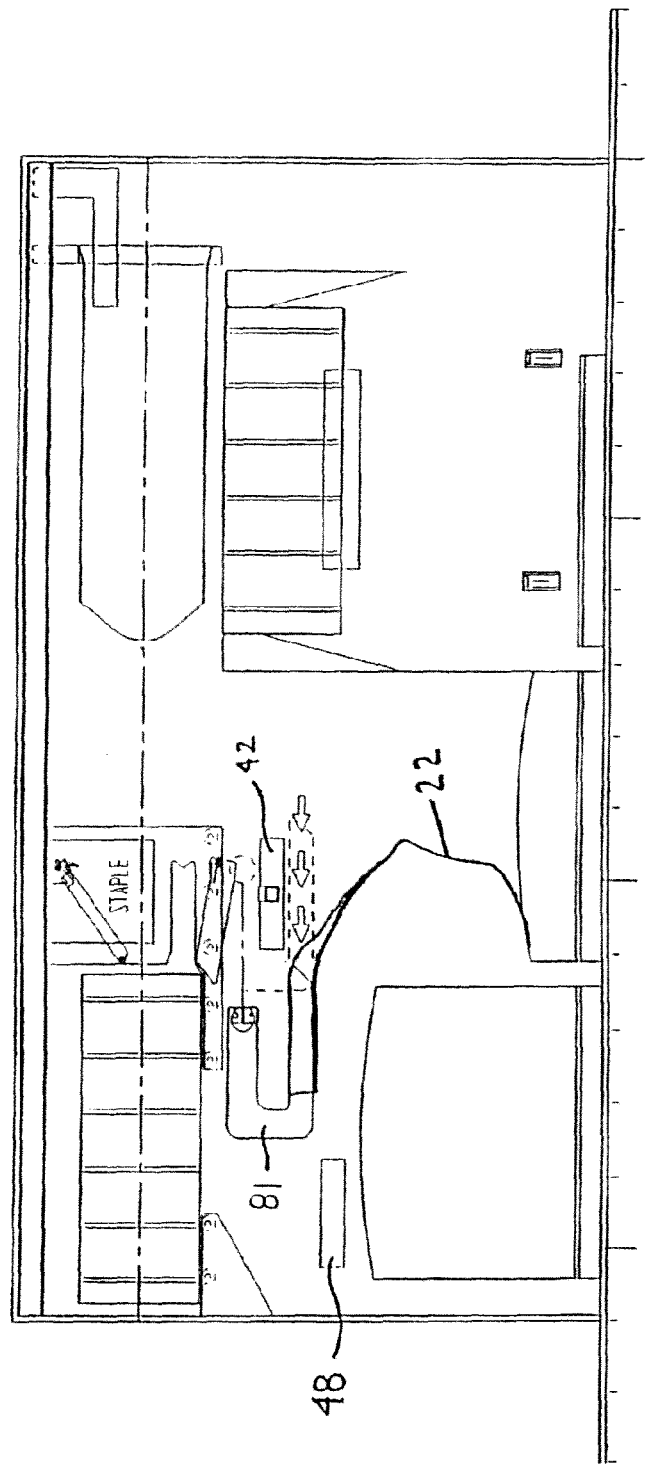

With reference now to FIG. 6, when the open end 58 of the bag 22 is attached to both the bag retriever 42 and the lower bag separator 48, the bag retriever 42 returns to its initial position, thus separating the two sides 54 of the bag and expanding its open end 58. In one embodiment, only part of the open end is opened by the bag retriever 42 and the lower bag separator, i.e., the open end is only partially opened by the device. Thus, if the open end has a width X, the opening is X-Y, which is a smaller increment than X. In one exemplary embodiment, the open end 58 is expanded enough to allow a separator 81 (FIG. 7) to be inserted into the opening of the bag, as described in more detail below. Specifically, the open end 58 of the bag may be opened by an amount in a vertical direction approximately equal to the gap defined by the bag retriever 42 and the lower bag separator 48 (FIG. 6).

As also shown in FIGS. 5 and 6, the bagging assembly 10 includes a pair of opposing bale guides 32 forming a channel 33 through which the bale elevator 45 travels. In one exemplary embodiment, the bale guides 32 are attached to and protrude from a side wall of the housing 12. Each bale guide 32 comprises an angled interior side wall 34 angled towards the channel 33 such that a width of the channel between the bale guides narrowingly tapers in a direction of the top wall 18 of the housing to align the bale as it is raised by the bale elevator. Alternatively or in addition thereto, a second set of bale guides are incorporated in a traverse position to align the bale along the transverse direction. Still alternatively, the assembly does not incorporate any guides and instead rely on a worker or an attendant to manually straighten the bale.

With further reference to FIG. 6, the bale elevator 45 ascends upward from its receiving position to an intermediate position defined in one exemplary embodiment as when a top surface 28 of the bale 26 is generally aligned with a top surface 30 of bale guides 32. More generally, in the intermediate position, the bale 26 does not interfere with movement of a chute 122 for bagging another bale that has previously been raised for bagging, as will be described in more detail below. Thus, an aspect of the present invention is a method for operating a bale bagging assembly comprising the step of raising a pressed bale from a first position to a higher intermediate position, the higher intermediate position being a position in which the upper surface of the pressed bale is lower, elevation-wise, than a traversing stuffing assembly.

Referring now to FIGS. 7 and 8A-8C, the bag positioning assembly 80 includes a separator 81 having two substantially identical positioning arms 82 attached along rotatable guide rods 86, the positioning arms each having a generally U-shaped configuration in which an upper section is attached to the rotatable rod 86 and a lower section or operating finger 84 is used to fully open the bag, as further discussed below. As shown in FIGS. 7, 8A and 8B, the separator 81 moves from an initial position (FIG. 8A) to an inserted position (FIG. 8B) wherein the operating fingers 84 penetrate the open end 58 of the bag 22 that has been opened by the bag retriever 42 and the lower bag separator 48, or alternatively by a robot arm or a Cartesian coordinate robot in combination with gravity or a burst of air. In a preferred embodiment, the two arms 82 come together so that they touch or almost touch in the initial position to present a relatively small profile to facilitate insertion into the open end of the bag. In one exemplary embodiment, carriages 201 located on opposing sides of the bag positioning assembly 80 provide support for the guide rods 86, a motor 202 and belt 203, and hydraulic or pneumatic cylinders 200 for laterally moving the positioning arms 82, as described in more detail below. The carriages 201 are slidable along a track 204 to move the bag positioning assembly 80 from the initial position to the inserted position. Once the separator 81 is in the inserted position, the positioning arms 82 are separated along the guide rods 86 such that the positioning arms abut opposite sides 54 of the bag 22 in an engaged position, as shown in FIG. 8C. In the engaged position, the bag 22 is tensioned between the positioning arms 82 such that the bag can be manipulated by the separator 81 without disengaging from the separator. In one exemplary embodiment, hydraulic or pneumatic cylinders 200 (FIG. 8A) move the two arms 82 together and apart along the guide rods 86. Alternatively, the arms 82 may be separated and/or brought together by, for example, one or more motorized acme threaded rods, or a rack and gear configuration. Thus, another aspect of the present invention is a bale bagging assembly comprising a bag positioning assembly comprising a separator, wherein said separator comprising two displaceable arms configured to move away from one another to place an open end of a bag in tension.

With reference now to FIGS. 9-11A, the bag attachment mechanisms on the bag retriever 42 and on the lower bag separator 48 are deactivated following positioning of the positioning arms 82 against the two sides of the bag (FIG. 8) with sufficient force so that the bag does not unintentionally separate from the separator 81. It is also possible to expand the position arms 82 outward inside the bag until they come to an external 'outside' plate or stop to then pinch or pin the bag between the positioning arms and the stops. This would prevent the bag from slipping off of the arms. The lower bag separator 48 then returns to its stowed position (FIG. 9) and the separator 81 returns to its initial position (FIG. 10) on carriage 201 with the bag 22 engaged thereto thereby moving the bag to the left of FIG. 9. Note that left and right locations denote two distinct positions, such as a first location or position compared to a second location or position. In one embodiment, the separator 81 is moved sufficiently to the left of FIG. 1 in returning to its initial position so that the bag is unfolded from its folded position when located on the bin. From its initial position, the guide rods 86 (FIG. 8C) are rotated 180 degrees along their longitudinal axis on pivots mounted on carriages 201 (FIGS. 11 and 11A) by the motor 202 and belt 203, thereby rotating the separator 81 so that the open end 58 of the bag faces the chute 122 such that a lower side of the bag is generally aligned with the lower edge of the chute 122. Rotation of the guide rods 86 is accomplished in one exemplary embodiment with the motor 202 and the belt 203, but in alternate embodiments, a rack and gear, pneumatic or hydraulic rotator may also be used.

With reference now to FIGS. 12-13A, an upper bag expansion assembly 90 includes a plurality of upper bag grippers 205 spaced along a rod 212 supported by upper bag expansion arms arms 214. Similarly, a lower bag expansion assembly 92 includes a plurality of lower bag grippers 206 spaced along a rod 216 supported by lower bag expansion arms 218. The separator 81 advances along the track 204 toward the upper and lower expansion assemblies 90, 92. The relative positions of the opening of the bag and the grippers 205, 206 are such that the upper and lower bag grippers 205, 206 engage the upper and lower sides of the bag 22 between the two positioning arms 82 (FIG. 12A) as the separator move toward the grippers. In one embodiment, one or more sensors (not shown) are used to detect the approaching bag 22 to then stop the advancing motion and toggle the grippers 205, 206 to initiate gripping. However, as one of ordinary skill in the art will appreciate, other means could be used to attach the bag to the expansion assemblies 90, 92, such as a vacuum system. When the upper and lower bag grippers 205, 206 are attached to the bag 22, the positioning arms 82 move toward each other slightly to disengage from the bag, i.e., to release pressure on the sides of the bag. The separator 81 then continues to slide toward the chute by a distance adequate to allow the operating finger 84 of each positioning arm to exit the end of the bag (FIGS. 13 and 13A). In another embodiment, the separator 81 may continue to advance towards the chute to separate from the bag without having to first move the positioning arms 82 together since the width of the bag will reduce when the opening is opened by the upper and lower expansion assemblies and therefore should not cause interference. In one embodiment, the grippers 205, 206 may incorporate frictional features, such as rubber inserts, roughened plastic pieces, etc., to provide a firmer grip around the opening of the bag.

With reference now to FIGS. 13B and 13C, the upper expansion assembly 90 is rotated upwardly towards the top wall 18 to a raised position and the lower expansion assembly 92 is rotated downwardly to a lowered position to widen the open end 58 of the bag 22 so that the bag can be positioned over the chute 122. Simultaneously, the positioning arms 82 move along the guide rods 86 to their full expanded position such that when the separator 81 moves away from the bale guide 32 and is rotated back to its initial position, the arms 82 do not interfere with or become ensnared on the bag 22.

The bag stuffing assembly 120 will now be described with reference to FIGS. 14-15. The bag stuffing assembly 120 comprises the chute 122 moveable into the bag 22 to expand the bag, thereby more easily allowing the bale 26 to be inserted into the bag. Alternatively, the chute may be stationary and the bag moved over the chute. More generically, the chute is located inside the bag. With reference specifically to FIG. 15, in one exemplary embodiment, the chute 122 comprises a base wall 130 and a pair of side walls 132 extending from the base and forming an open-ended channel 134 therebetween. A ledge 136 may extend orthogonally from a top of each side wall 132 partially across a top of the channel to support part of the bag as the bag is placed there over. The channel 134 defined by the base wall 130, side walls 132, and ledge 136 is dimensioned to house a bale 26 therein. A bale receiving area 138 is located at a proximal portion of the chute 122 wherein receiving area sides walls 139 extend outwardly from the side walls 132 to provide a shoulder 141 and a wider channel between the side walls that acts as a funnel to direct the bale into the channel 134. Additionally, a pair of spaced parallel rotatable bars 142 extend between the receiving area side walls 139 to facilitate insertion of the bale into the chute, i.e., the bars rotate as the bale is slid over them. A pair of spaced ribs 144 may extend along an exterior of the receiving area side walls 139 to provide additional resistance to absorb the impact of a bale 26 as the bale is pushed into the chute 122, as will be described in more detail below. In another exemplary embodiment, the ribs 144 are horizontally rotatably mounted on receiving wall 139, permitting the side walls 132 to be rotated toward or away from each other. Rotating the side walls 132 toward each other would ease placing the chute 122 in to the bag 22. The bale 26 would expand the side walls 132 into the bag as the bale 26 is forced into the chute 122. Also, if the bale 26 is larger than a standard bale, the rotation of the side walls 132 would allow the bale 26 to stretch the bag by over-expanding the side walls 132. Although a typical bale chute is described herein, the chute 122 may embody any suitable configuration, such as a single piece composed of multiple longitudinal rods or plates comprising a soft piece of plastic or fabric. For example, a single piece chute as shown in FIGS. 18 and 19 may be used, as further discussed below. Still further, any device that would allow the bag 22 to be pulled onto the bale 26 while keeping the bag from excessive dragging forces on the surfaces of the bale may be used.

Figure 14:
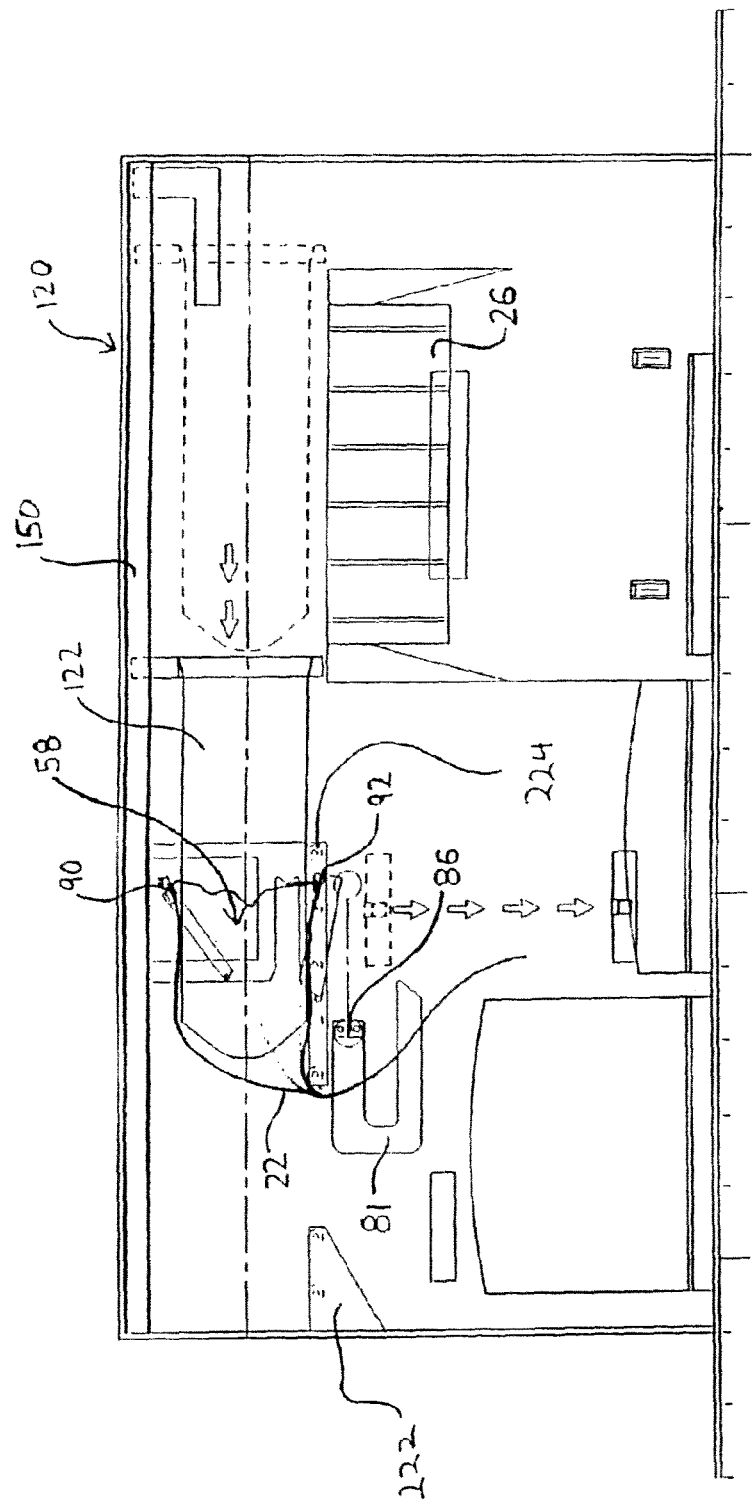

With reference again to FIG. 14 and also to FIG. 14A, the chute 122 is mounted on a rail 150, preferably one on each side wall of the chute, to be moveable from an initial position (shown in phantom) to a loaded position at least partially inside the bag in which at least some of the side walls 132 of the chute are located within the bag 22 and the shoulder 141 generally abuts the open end of the bag. In the loaded position, the base wall 130 of the chute 122 is located proximate center support 224 such that when the chute is removed, the bagged bale 26 will rest on the center support. Although the side walls 132 are of a length such that they extend significantly within the bag 22, it is not necessary for the chute 122 to extend into an entire length of the bag to affect its intended purpose. Rather, the bale 26 enters the bag with enough speed to expand a portion of the bag that may not have been expanded by the chute 122. However, even when moving at a slower speed, the size of the bale relative to the size of the bag will cause the bag to expand.

Figure 16C:
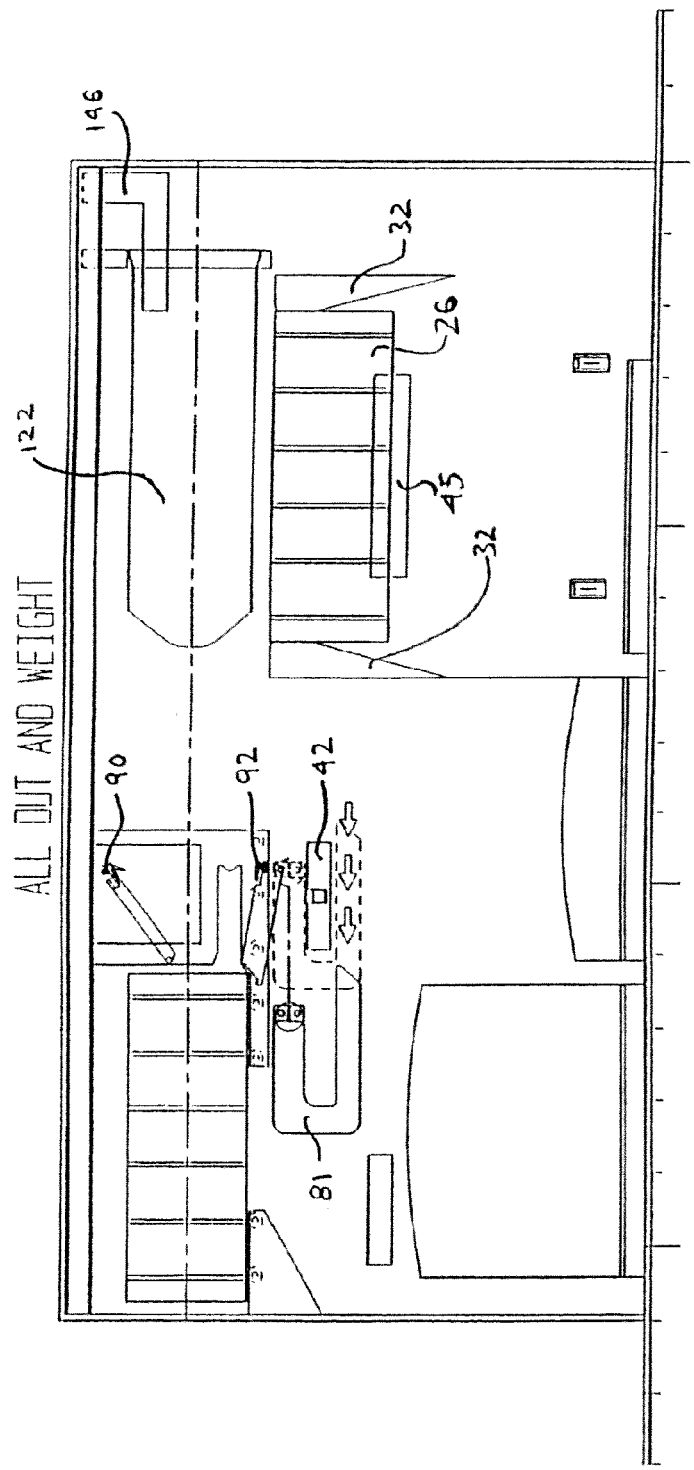
FIG. 16C is a side view of a bagging step of bagging a bale according to aspects of the present invention.

With reference now to FIG. 16-16C, as the chute 122 moves from its initial position to its loaded position, the bale elevator 45 ascends from its intermediate position to its upper delivery position. Thus, the chute may be viewed as an expander for expanding the bag and serves as a funnel to allow the bale to be stuffed into the bag. Additionally, its movement over to the loaded position provides clearance or space for the elevator to raise the bale. A stuffing arm assembly 146 is used to stuff the bale into the chute. In one exemplary embodiment, the stuffing arm assembly 146 comprises a combination motor, gear and chain system and configured to drive a generally L-shaped bracket. The L-shaped bracket is movable along a rail 150 extending along the top wall 18 housing 12. With reference again to FIGS. 1 and 3, the stuffing arm assembly 146 pushes the bale 26 from the bale elevator 45 through the bale receiving area 138 and into the channel 134 of the chute 122 (FIG. 16B), such that the entire bale is within the bag. With reference to FIG. 16C, once the bale 26 has been bagged, the chute 122 retreats to its initial position, to the right of FIG. 16C, while the stuffing arm remains in place to provide an opposing force against the retracting chute. When the chute 122 retreats to its initial position, the bagged bale 26 rests on the rear support 222 and a center support 224 so that the open end of the bag can be stapled closed.

In another exemplary embodiment, the chute 122 may be substantially stationary and the upper bag expansion assembly 90, and the lower bag expansion assembly 92, would be movable along a track, guide, or other means to pull the bag onto the chute. Once the bale 26 has been pushed into the bag, the bale pusher 146 would push the bale out of the chute 122, with the upper and lower expansion arms 90, 92, moving along a track or guide to follow the bale while continuing to grip the edge of the bag. Once clear of the chute, the stuffing arm assembly 146 would retract and the bag could be closed as described herein.

In yet another exemplary embodiment, the bale 26 may be substantially stationary and the upper bag expansion assembly 90, and the lower bag expansion assembly 92, would be movable along a track, guide, or other means to pull the bag onto the chute 122. The chute 122 and the bag, held in place by the upper and lower expansion arms 90, 92, would move together to pull the bag onto the bale 26, held in place by the stuffing arm assembly 146. The chute may then be separated from the bag while the upper and lower expansion arms 90, 92, remain attached to the bag to allow sealing of the bale as described herein once the stuffing arm assembly retracted.

In still another exemplary embodiment, the chute assembly 122 may move into the bag expanded by the upper and lower expansion arms 90, 92, then move over the bale 26, pulling the bag onto the bale 26 with the expansion arms following the bag. Then the bale may be pushed out of the chute 122 by the stuffing arm assembly 146, with the expansion arms following the bag and bale. Once the bale has exited the chute, the upper and lower expansion arms 90, 92, remaining attached to the bag on the bale, the stuffing arm assembly 146 may retract to allow the bag to be sealed as described herein.

With reference now to FIGS. 16D-16K, a sealing or enclosing assembly 160 for closing the open end of the bag 22 is provided in accordance with aspects of the present invention. With reference to FIG. 16D, a pair of opposite sealing plates 162 is laterally movable to engage an open end 58 of the bag 22, which is still held open by the upper and lower expansion assemblies 90, 92. In one exemplary embodiment, the sealing plates 162 are generally configured to have a height substantially equal to or slightly smaller than the height of the bale 26. A leading edge 164 of each sealing plate 162 may be tapered to reduce the likelihood that the sealing plate will tear the bag 22 during the sealing process, as described in more detail below. Additionally, each sealing plate 162 contains a notch or a hole 166 through which a staple 154 may be inserted during the sealing process. The stuffing arm assembly 146 includes a base arm 168 extending from the rail 150 (FIG. 16) in a first direction for moving the stuffing arm assembly, a cross arm 170 extending generally perpendicularly to the base arm from an end of the base arm in a second direction, and a pair of staplers 172 extending from the cross arm in a third direction. The staplers 172 are adapted to receive a staple magazine 174 containing a staple supply. Alternatively, a single staple may be used with each stapler, one at a time, instead of a magazine. Additionally, the staplers 172 may serve to stuff the bale into the bag or be mounted on the stuffing arm assembly 146 as described above.

Figure 16F:
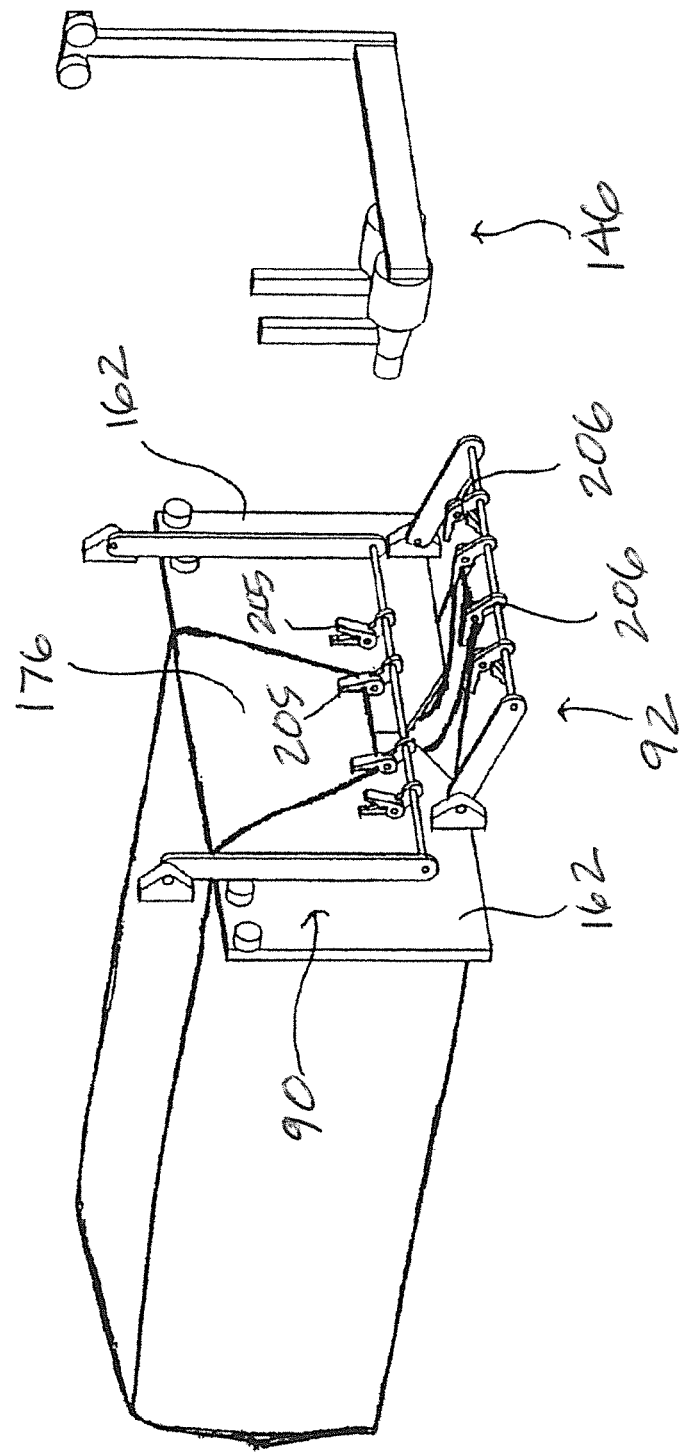
Figure 16G:
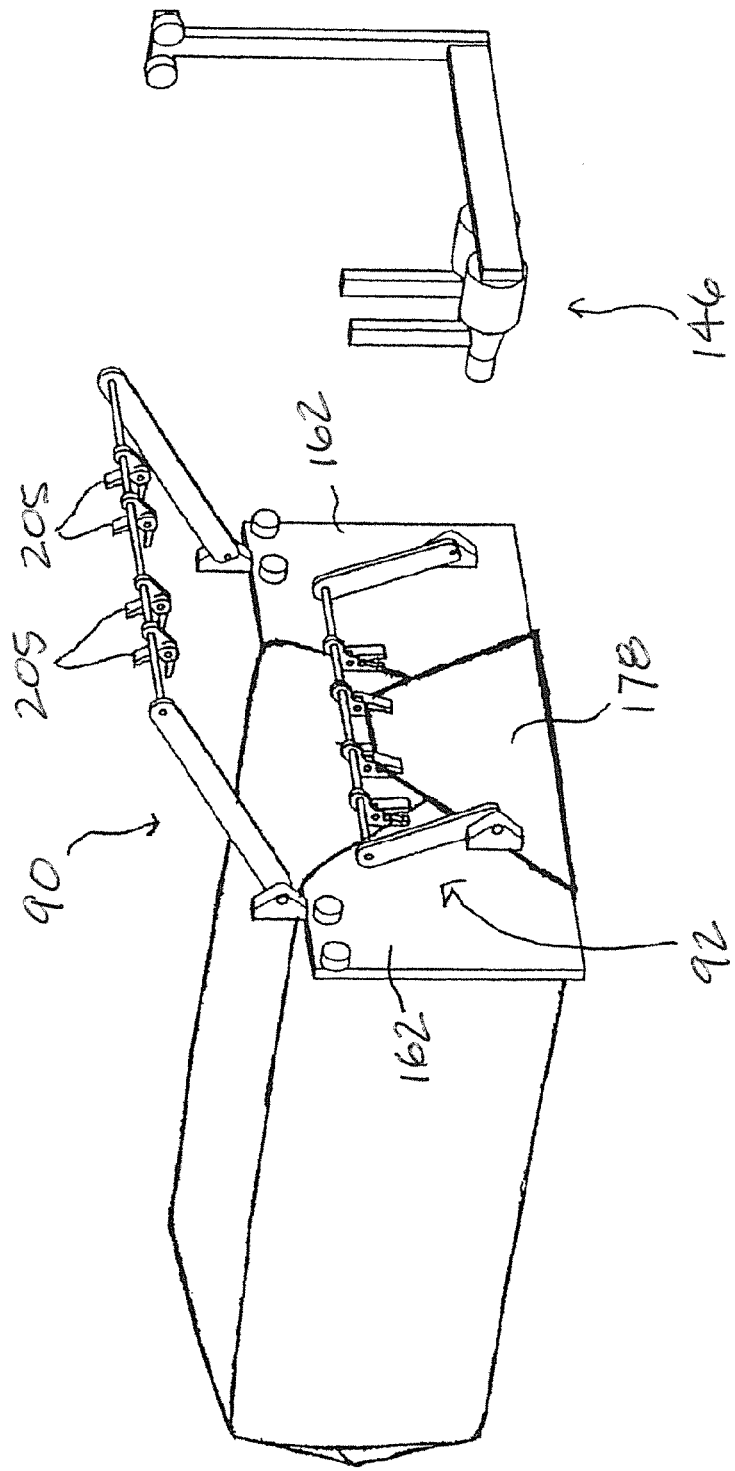

Operation of the sealing assembly 160 will now be described with reference to FIGS. 16D-16K. Generally, the open end 58 of the bag is folded similarly to wrapping a box with wrapping paper. More specifically, as shown in FIG. 16D, the upper and lower bag expansion assemblies 90, 92 are attached to edges of the bag 22 to provide an open end 58 through which the bale 26 has been inserted. The sealing plates are located laterally from the bag 22 generally aligned with an end of the bale proximate the open end 58 of the bag. Although omitted for clarity, the sealing plates 162 are laterally movable toward and away from the bag 22 on, for example, rails, guides, a track, or other known mechanical attachment devices. With reference now to FIG. 16E, the sealing plates 162 are moved toward each other such that the leading edge 164 of each plate contacts the side of the bag 22 and folds it around the bale and toward a center of the bag. In one exemplary embodiment, as the sealing plates 162 fold the sides of the bag 22 inwardly, the outermost upper and lower bag grippers 205, 206 are opened to release their grip on the bag to allow a sufficient amount of the bag to be folded, while the inner upper and lower bag grippers maintain a grip on the bag. Further, the sealing plates 162 may be moved until the leading edges 164 on each plate abut each other and the notches 166 form a single opening in substantially a center of the edge of the bag 22. As shown in FIG. 16F, the upper bag expansion assembly 90 is moved from a raised position to a lowered position such that a top edge 176 of the bag 22 is folded over the sealing plates, and more particularly, over the notches 166 in the sealing plates. With reference to FIG. 16G, the upper bag grippers 205 are released from the bag 22 and the upper bag expansion assembly 90 is moved back to the raised position as the lower bag expansion assembly 92 is moved from a lowered position to a raised position, folding a bottom edge 178 of the bag over the sealing plates 162 and over the notches 166 in the sealing plates.

Figure 16H:
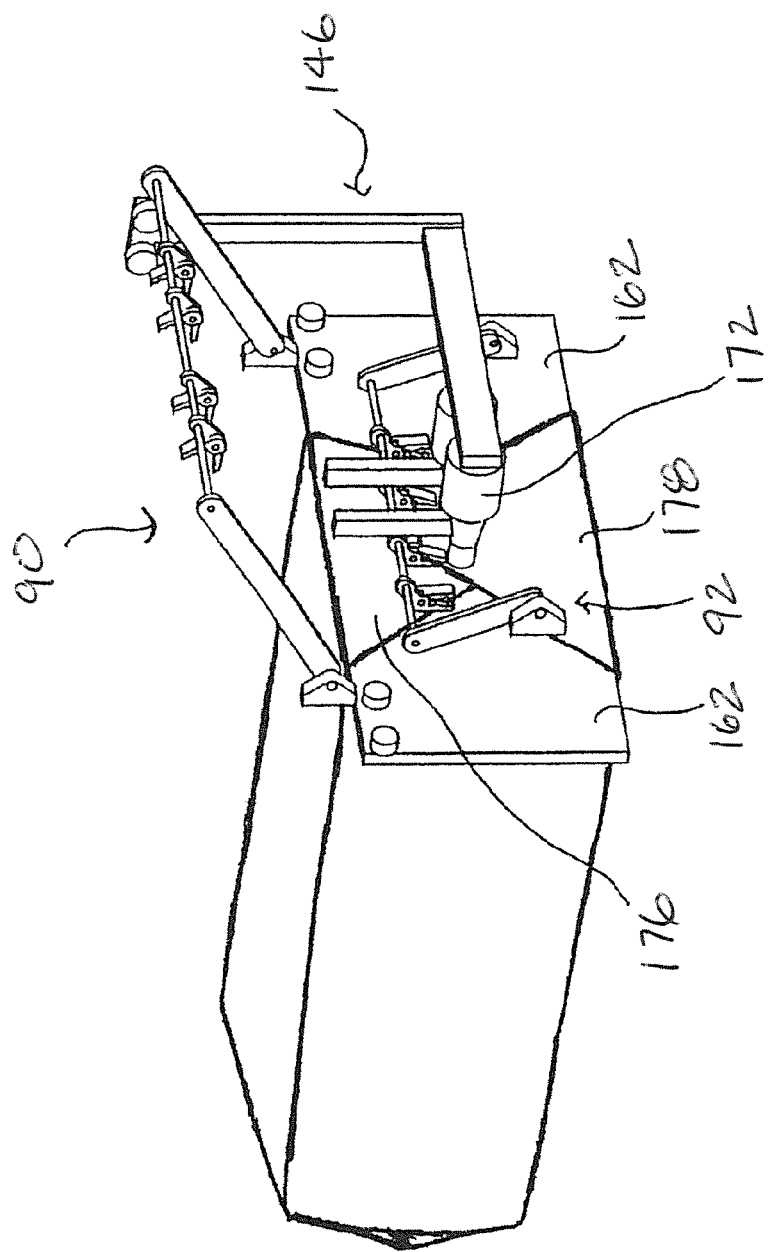
Figure 16J:
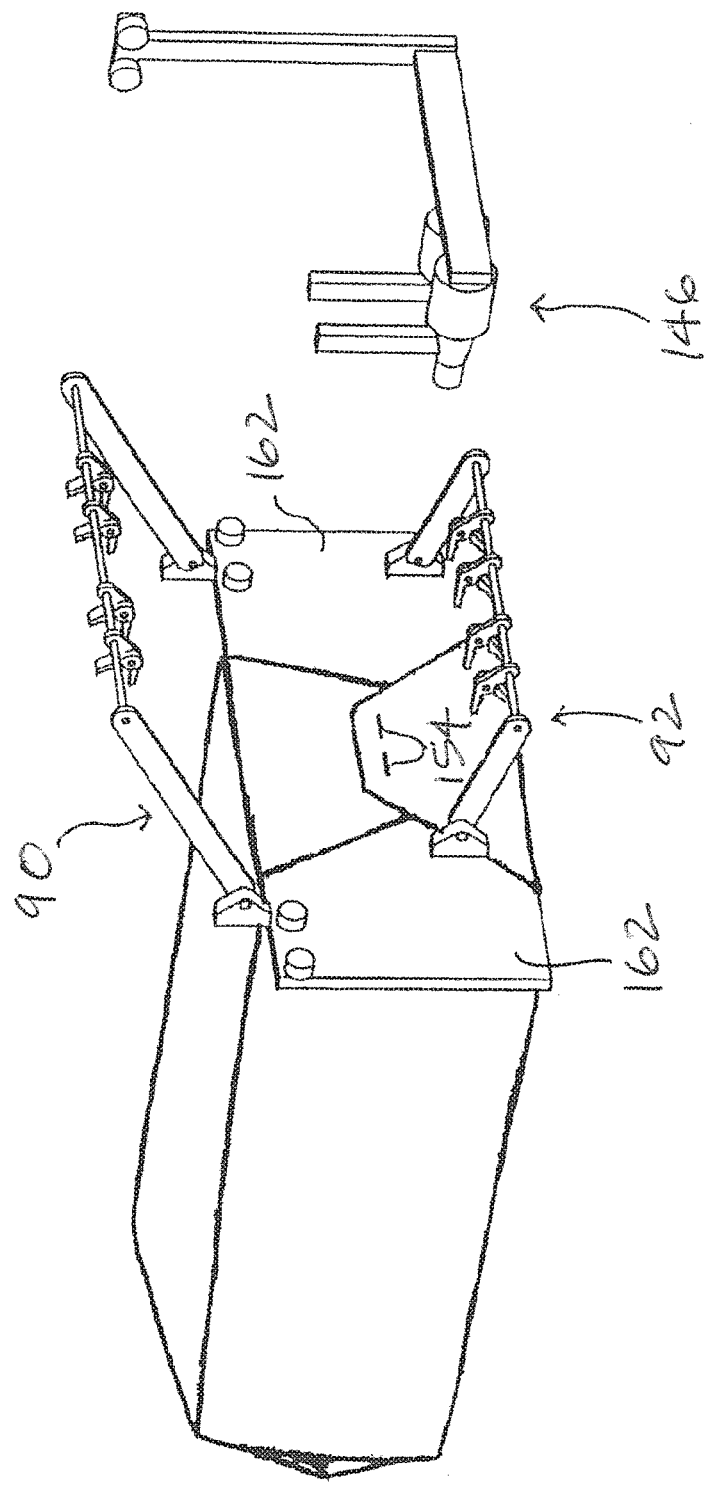

As shown in FIG. 16H, the stuffing arm assembly 146 is then moved toward the bag 22 and the staplers 172 are aligned with the notches 166 located between folded sides of the bag, which as previously disclosed may be circular or have other shapes instead of notches. In one exemplary embodiment, each stapler 172 inserts one staple into the bag 22. However, one of skill in the art will appreciate that only one staple may be used, or that more than two staples may be used. With reference now to FIGS. 16I-16K, the stuffing arm assembly 146 retreats from the stapled bale 22 (FIG. 16I), the lower bag grippers 206 are opened to release their grip from the edge of the bag, and the lower bag expansion assembly 92 is moved to the lowered position (FIG. 16J), and the plates are moved laterally outwardly to be disengaged from the bag 22. Once the bag has been sealed as described above, the bag may be pushed by the bag stuffing assembly 146 out of the bale bagger onto a conveyor from where it can be further transported.

With reference now to FIGS. 17a-17f, exemplary staples 154a-154f for use with the stapling assembly 152 are shown. Staple 154a will be described in detail, but it will be understood that although certain dimensions of the staples 154 may vary, each staple has a generally similar shape. With reference to FIGS. 17a and 17b, the staple 154a may have a generally flat side profile and a tip 160 tapering to a point. In an unused state, each staple 154 comprises a base 156 from which two prongs 158 extend generally orthogonal to the base and the sharpened tip 160 is formed at an end of each prong configured to pierce the bag 122. For example, such tip 160 may include two angled sides (e.g., FIG. 17b) or a single angled side (e.g., FIG. 17e) with respect to a side of the staple. Additionally a barb 162 may be formed on each prong 158 such that the barbs face each other on an interior side of the staple. In one exemplary embodiment, the staples 154 are made from a polymeric material such as nylon or other plastics, but the staples may also be composed of metal.

In a further aspect of the present invention, a method is provided for enclosing a bag having a pressed bale positioned therein, the method comprising folding the opening of the bag so that sections of the bag near the opening overlap, and using a stapler to discharge a staple into the overlapped sections of the opening. Preferably, the staple has an elongated prong and at least one barb on the prong to hook the overlapped sections of the bag and/or the pressed bale. More preferably, the staple has a base and two elongated prongs each with at least one barb for hooking the overlapped sections of the bag and/or the pressed bale. In one embodiment, the stapling may be performed automatically as disclosed with reference to FIGS. 16D-16K or it may be done manually with a handheld or manually operated stapling gun.

With reference again to FIG. 1, after the bale is bagged and stapled, it is further pushed by the stuffing assembly 120 towards the exit end wall 16 to a lowering elevator (shown schematically only in FIG. 11). For example, the end wall may have an opening sized to permit the bagged bale to exit the bagging assembly. In one embodiment, the lowering elevator comprises a platform pivotably mounted to the housing. The platform further comprises one or more rollers to facilitate placement of the bagged bale thereon when pushed by the stuffing assembly. To lower the bagged bale from the elevated position so it can then be processed or shipped, two or more actuated cylinders are used to pivot the platform so that an edge of the platform located away from the housing is pivot downward to lower the bagged bale. A conveyor system, a palette, or other movable means may be used to then move the bagged bale away from the housing for further processing.

Referring now to FIGS. 18 and 19, an alternative chute 230 for facilitating insertion of a strapped bale into a bag for bagging the bale are shown. The alternative chute 230 may be used with the bagging assembly 10 of the present invention, for example, as a replacement for the chute 122 shown and described elsewhere herein. In one embodiment, the alternative chute or simply "chute 230" is singularly formed from a rolled metal sheet or plate 240. For example, the metal sheet or plate may be cut along various seams with pre-configured contours so that after the cut sheet or plate is rolled, it produces a chute comprising a flared receiving end 232 and a low profile exit end 234.

In a particular embodiment, the chute 230 comprises a continuously formed center section 236 and two side sections 238 formed by bending the sheet or plate 240 along two seams 242. The sheet or plate 240 also includes a plurality of cuts or notches 244 for forming flared sections of the flared receiving end 232 to facilitate alignment and reception of the strapped bale. The two side sections 238 may additionally function as mounting flanges by incorporating a bolt pattern 246 for mounting onto a bracket that is in turn mounted to a drive system for traversing the chute between a home position (FIG. 5) and a used or stuffing position (FIG. 4). The chute is preferably arranged similar to a U shape with the open channel of the U facing up and the continuous center section of the U facing down.

Referring specifically to FIG. 18, the two side sections 238 are provided with rounded corners 246 that tapered or inclined along a side edge 248 to an apex 250. The apex 250 is located on a section of the side wall 238 that is flared radially outwardly. The flared section of the side wall allows the chute to push a bag outwardly for easier insertion of the strapped bale. The flared section also creates a space or gap between the bag and the chute to further allow air to be purged from the interior cavity of the bag as the bale is pushed therein.

With reference to FIGS. 18 and 19 and also to FIGS. 12-14A for a description on the use of the alternative chute 230, the chute 230 is designed to operate with the upper and lower bagging assemblies 90, 92 to arrange a bag over the chute. As previously discussed, after the grippers 205, 206 on the upper and lower bagging assemblies 90, 92 grip the opening of the bag and expand the opening, the chute 230 is programmed to move into the bag with the grippers continuing to hold the bag open with the bag moving over a stationary chute contemplated. In a preferred embodiment, chute 230 is inserted into the bag and stops at about a point where the perimeter of the bag is at the transition or interface near the apex 250 of the flared section. This allows the strapped bale to contact the flared section of the chute before coming into contact with the bag, which reduces possible snaring. In another embodiment, due to the manner in which the chute is mounted to a movable bracket, the chute is configured to be inserted until the left bolt pattern 252 come in contact with the bag. The remaining steps for completing the bagging and stapling cycles may be repeated as discussed above.

Referring again to FIGS. 18 and 19, the chute 230 may be viewed as an insertion chute. As bales are more uniformly pressed and strapped in some markets, it is useful to simplify a bagging system by using a chute that is no more than a tray or a bale support with little or no vertical sides to facilitate inserting the bale into a bag, which is also available in bulk with consistent size. Thus, a complex chute is not required to accommodate varying bale sizes. Instead, a tray may be used to simply get an end of a bale into an open end of the bag wherein the bale comprises a support structure having a center section for supporting a pressed bale and two side walls extending upwardly therefrom.

In another embodiment, a bag may be pulled over a bale located on an insertion tray while keeping the tray and the bale stationary. As another alternative, both the bag and the combination tray and bale may be moved in unison during the bagging process. The bag only needs to be big enough to allow the bale to slip into the open end of the bag. Alternatively, the bag may be made of a material that allows it to stretch a needed amount to accommodate the bale. The insertion tray allows for a smaller cross section to be initially started into the bag to open the bag, thus reducing hang ups or snagging of the bag on the tray as the mechanism is inserted into the bag. The insertion tray allows for simplified mechanics which is desirable. Because the vertical sides are not substantially needed for bagging purposes, they can be shaped to aid placing a bag over the chute if desired. Such as a leading edge that has soft, broad contours. If side walls are employed and because they are fixed in nature with only material flexibility, identification stickers or placards may be placed thereon to be transferred to the bag before the chute is removed. Because the chute side will substantially be placed in the same location repeatedly every cycle, if desired, automatic marking equipment can be employed with simplified mechanisms.

Although limited bagging assembly embodiments have been specifically described and illustrated, many modifications, combinations, and variations of the embodiments will be apparent to those skilled in the art. For example, the dimensions and positioning of the components within the housing may be modified to achieve their intended purpose. Further, although the bagging assembly is intended to run continuously and operate on multiple bags and/or bales simultaneously, the bagging assembly may operate on a single bag and bale and, to the extent possible, may prepare the bag to receive the bale and prepare the bale to be inserted into the bag sequentially rather than simultaneously. Accordingly, it is to be understood that the bagging assembly constructed according to principles of this invention may be embodied other than as specifically described herein. The invention is also defined in the following claims.

What is claimed is:

1. A bagging assembly for bagging a pressed bale comprising:
   a frame having a first end, a second end, and a longitudinal length between the first end and the second end;
   a bale stuffing assembly comprising a planar end surface sized and shaped to push a pressed bale into a chute having a bag material located on an exterior thereof; said bale stuffing assembly arranged on a lengthwise track and movable along the lengthwise track to push a pressed bale, and wherein said chute has a length and side walls defining a chute cavity sized and shaped to receive a pressed bale;
   a gripper with a gripping surface mounted adjacent the chute, the gripper adapted for gripping and placing a bag material over the chute to enclose the pressed bale;
   a bale sampling device located upstream of the chute comprising two pivotable edges arranged to move together to grab a bale sample from a pressed bale before the pressed bale is pushed through the chute and out an outlet end of the chute; and a bag closure system comprising movable closing edges for folding at least two different edge sections of a bag material to close an open end of the bag material.

2. The bagging assembly of claim 1, further comprising a bale transfer assembly comprising at least one of rotatable elements, a motorized vehicle, and a hand truck for delivering a pressed bale to the chute to be bagged.

3. The bagging assembly of claim 2, wherein the bale transfer assembly is movable from a first elevation to a second elevation, which is higher than the first elevation, to move a pressed bale from the first elevation to the second elevation.

4. The bagging assembly of claim 3, further comprising a bale guide comprising a side surface to align a pressed bale before the pressed bale enters the chute.

5. The bagging assembly of claim 4, wherein the two pivotable edges of the bale sampling device is a first set of two pivotable edges and wherein the bale sampling device comprises a second set of two pivotable edges configured to move together to grab a second bale sample.

6. The bagging assembly of claim 5, wherein the first set of two pivotable edges is located on a first side of a pressed bale and the second set of two pivotable edges is located on a second side of the pressed bale, spaced from the first side.

7. The bagging assembly of claim 1, further comprising a bag positioning assembly comprising two arms mounted on at least one rotatable guide rod so that the two arms are translatable along the longitudinal length of the frame and are rotatable from a first orientation to a second orientation about the at least one rotatable guide rod.

8. The bagging assembly of claim 1, wherein the gripper comprises two elongated fingers that are pivotable to grip a bag material therebetween.

9. The bagging assembly of claim 1, wherein the bale sampling device is movable from a position spaced from a pressed bale to a position in contact with the pressed bale.

10. The bagging assembly of claim 1, further comprising a bale transfer assembly comprising a fork for lifting a pressed bale from a first elevation to a second higher elevation to be bagged.

11. The bagging assembly of claim 10, further comprising rotatable elements downstream of the chute for moving a bagged bale away from the chute.

12. The bagging assembly of claim 10, wherein the two pivotable edges of the bale sampling device is a first set of two pivotable edges and wherein the bale sampling device comprises a second set of two pivotable edges configured to move together to grab a second bale sample.

13. The bagging assembly of claim 10, wherein the bale sampling device is located along a path that a pressed bale moves for pushing through the chute.

14. The bagging assembly of claim 1, wherein said two pivotable edges of the bale sampling device are each movable along an arc.

15. The bagging assembly of claim 14, wherein said two pivotable edges are rotatable relative to a sample bay for holding a bale sample at least in part between the sample bay and the two pivotable edges.

16. The bagging assembly of claim 15, wherein the sidewalls of the chute are expandable away from one another and collapsible towards one another.

17. The bagging assembly of claim 14, further comprising a bag positioning assembly spaced from the bale stuffing assembly and comprising a gripping surface that is movable relative to the chute to move a bag material over the chute.

18. The bagging assembly of claim 1, further comprising a bale comprising a plurality of straps strapping the pressed bale.

19. A bagging assembly for bagging a pressed bale comprising:
   a frame structure having a first end, a second end, and a longitudinal length measured therebetween;
   a chute having a receiving end, an outlet end, two spaced apart side sections defining a gap therebetween; and a longitudinal length aligned with the longitudinal length of the frame structure; said receiving end of the chute being sized and shaped to receive a pressed bale;
   a stuffing assembly in dynamic arrangement with the chute having a generally planar end surface for pushing a pressed bale through the receiving end of the chute to be bagged;
   a bag positioning assembly spaced from the stuffing assembly and comprising a gripping surface that is movable relative to the chute to move a bag material over the chute;
   a bale sampling device comprising a gripper with two movable edges located adjacent the chute for collecting a bale sample from a pressed bale as the pressed bale is moved to be bagged, said two movable edges of said gripper being movable towards one another to grip said bale sample and movable away from one another to release said bale sample;
   a bag closure system comprising movable closing edges for folding at least two different sections of a bag material to close an open end of the bag material to enclose a pressed bale therein; and
   a bale transfer assembly for moving a pressed bale towards the chute to be bagged, said bale transfer assembly comprising a movable support surface for moving a pressed bale.

20. The bagging assembly of claim 19, wherein the movable support surface of the bale transfer assembly comprises a fork for lifting a pressed bale from the first elevation to the second higher elevation.

21. The bagging assembly of claim 20, wherein an opening at the receiving end of the chute is larger than an opening at the outlet end.

22. The bagging assembly of claim 21, further comprising rotatable elements downstream of the chute for moving a bagged bale away from the chute.

23. The bagging assembly of claim 22, further comprising a pressed bale bagged inside a bag comprising two closed ends.

24. The bagging assembly of claim 20, wherein said movable edges of the bale sampling device are rotatable relative to a sample bay for holding a bale sample at least in part between the sample bay and the two movable edges.

25. The bagging assembly of claim 20, further comprising a bale guide comprising a side surface to align a pressed bale before the pressed bale enters the chute.

26. The bagging assembly of claim 19, further comprising a bale comprising a plurality of straps strapping the bale in a pressed state.

27. The bagging assembly of claim 19, wherein the bag positioning assembly comprises two arms that are translatable between the first end and the second end of the frame and are rotatable from a first direction to a second direction.

28. The bagging assembly of claim 19, wherein the movable support surface comprises plurality of rotatable elements.

29. The bagging assembly of claim 28, wherein said two movable edges of the bale sampling device are rotatable relative to a sample bay for holding a bale sample at least in part between the sample bay and the two movable edges.

30. The bagging assembly of claim 29, wherein the gripper of the bale sampling device is a first gripper and wherein the bale sampling device comprises a second gripper configured to rotate to grab a second bale sample.

31. The bagging assembly of claim 30, wherein the movable support surface of the bale transfer assembly is adapted to move from a first elevation to a second elevation, which is higher than the first elevation to move a pressed bale between two different elevations.

32. The bagging assembly of claim 28, further comprising a bale guide comprising a side surface to align a pressed bale before the pressed bale enters the chute.

33. The bagging assembly of claim 19, wherein the chute is stationary as the stuffing assembly moves to stuff a pressed bale into the chute.

34. A bagging assembly for bagging a pressed bale comprising:
   a bale transfer assembly with a support surface located upstream of a chute sized and shaped to move a pressed bale for bagging;
   the chute having a receiving end, an outlet end, and two spaced apart side sections defining gap for receiving a pressed bale;
   a stuffing assembly in dynamic arrangement with the chute comprising a push end adapted to stuff a pressed bale into the receiving end and through the chute to be bagged;
   a bag positioning assembly comprising movable gripping surfaces to move a bag material over the chute for bagging the pressed bale;
   a bale sampling device for collecting a sample from a pressed bale mounted along a path of a moving pressed bale, said bale sampling device comprising a gripper comprising at least two movable gripping edges that move towards one another to grip a bale sample from a pressed bale; and
   at least one rotatable element for moving a bagged bale away from the chute.

35. The bagging assembly of claim 34, wherein the bale transfer assembly comprises a fork for lifting a pressed bale.

36. The bagging assembly of claim 35, further comprising a bag closure system for enclosing an open end of a bag material to enclose a pressed bale therein, said bag closure system comprising movable closing edges for folding at least two different sections of a bag material.

37. The bagging assembly of claim 36, wherein the movable support surface of the bale transfer assembly is adapted to move from a first elevation to a second elevation, which is higher than the first elevation to move a pressed bale between two different elevations.

38. The bagging assembly of claim 34, wherein the bale transfer assembly comprises at least one of rotatable elements, a motorized vehicle, and a hand truck for delivering a pressed bale to the chute to be bagged.

39. The bagging assembly of claim 34, wherein the gripper of the bale sampling device is a first gripper and wherein the bale sampling device comprises a second gripper configured to rotate to grab a second bale sample on a side of a pressed bale opposite the first gripper.

40. The bagging assembly of claim 39, further comprising a bag closure system for enclosing an open end of a bag material to enclose a pressed bale therein, said bag closure system comprising movable closing edges for folding at least two different sections of a bag material.

41. The bagging assembly of claim 40, wherein the at least two movable gripping edges of the gripper of the bale sampling device are rotatable relative to a sample bay for holding a bale sample at least in part between the sample bay and the two rotatable edges.

42. The bagging assembly of claim 34, wherein the bag positioning assembly further comprises a retrieval assembly comprising at least one of a plate with a vacuum source, a pickup head on a Cartesian coordinate robot, and a robot arm with an end effector.

43. The bagging assembly of claim 34, further comprising a bagged bale enclosed inside a bag translating along a surface away from the chute.

44. The bagging assembly of claim 34, wherein the at least two movable gripping edges of the gripper of the bale sampling device are rotatable relative to a sample bay for holding a bale sample at least in part between the sample bay and the two rotatable edges.

* * * * *